(12) United States Patent
Zondervan et al.

(10) Patent No.: US 7,334,050 B2
(45) Date of Patent: Feb. 19, 2008

(54) VOICE APPLICATIONS AND VOICE-BASED INTERFACE

(75) Inventors: Quinton Y. Zondervan, Boston, MA (US); Zareen Umair, Fremont, CA (US); Umair A. Khan, Fremont, CA (US); Lakshmi Raman, Sunnyvale, CA (US); Robin Marian, Boston, MA (US)

(73) Assignee: NVIDIA International, Inc., St. Michael (BB)

( * ) Notice: Subject to any disclaimer, the term of this patent is extended or adjusted under 35 U.S.C. 154(b) by 941 days.

(21) Appl. No.: 09/952,909

(22) Filed: Sep. 14, 2001

(65) Prior Publication Data

US 2002/0059073 A1 May 16, 2002

Related U.S. Application Data

(63) Continuation-in-part of application No. 09/906,382, filed on Jul. 16, 2001, now abandoned, which is a continuation-in-part of application No. 09/595,781, filed on Jun. 16, 2000, now Pat. No. 6,438,575.

(60) Provisional application No. 60/210,160, filed on Jun. 7, 2000.

(51) Int. Cl.
*G06F 15/16* (2006.01)
(52) U.S. Cl. ............... 709/246; 709/205; 709/206; 709/224; 709/231; 704/270.1
(58) Field of Classification Search ........ 709/203–207, 709/231, 246, 224; 704/270, 246, 270.1
See application file for complete search history.

(56) References Cited

U.S. PATENT DOCUMENTS 6,052,367 A * 4/2000 Bowater et al. ............ 370/352

6,452,609 B1 * 9/2002 Katinsky et al. ............ 715/716

(Continued)

OTHER PUBLICATIONS

U.S. Appl. No. 09/952,051 which was filed on Aug. 28, 2001.

*Primary Examiner*—Oanh Duong
(74) *Attorney, Agent, or Firm*—Zilka-Kotab, PC

(57) ABSTRACT

A system, method and computer program product are provided for initiating a tailored voice application according to an embodiment. First, a voice application is installed at a server. A request to instantiate the voice application is received from a user. User-specific configuration parameters are also received. An instance of the voice application is instantiated in a modified form based on the user-specific configuration parameters. A system, method and computer program product provide a voice-based interface according to one embodiment. A voice application is provided for verbally outputting content to a user. An instance of the voice application is instantiated. Content is selected for output. The content is output verbally using the voice application. The instance of the voice application pauses the output and resumes the output. A method for providing a voice habitat is also provided according to one embodiment. An interface to a habitat is provided. A user is allowed to aggregate content in the habitat utilizing the interface. A designation of content for audible output is received from the user. Some or all of the designated content is output. The user is also allowed to aggregate applications in the habitat utilizing the interface. Spoken commands are received from the user and are interpreted using a voice application. Commands are issued to one or more of the applications in the habitat via the voice application.

21 Claims, 10 Drawing Sheets

U.S. PATENT DOCUMENTS

| | | | |
|---|---|---|---|
| 6,513,060 B1 * | 1/2003 | Nixon et al. | 709/203 |
| 6,553,412 B1 * | 4/2003 | Kloba et al. | 709/219 |
| 6,578,000 B1 * | 6/2003 | Dodrill et al. | 704/270 |
| 6,594,348 B1 * | 7/2003 | Bjurstrom et al. | 379/88.13 |
| 6,601,111 B1 * | 7/2003 | Peacock et al. | 719/310 |
| 6,754,711 B1 * | 6/2004 | Dodrill et al. | 709/227 |
| 6,771,743 B1 * | 8/2004 | Butler et al. | 379/67.1 |
| 6,807,565 B1 * | 10/2004 | Dodrill et al. | 709/206 |
| 6,807,574 B1 * | 10/2004 | Partovi et al. | 709/224 |
| 6,895,558 B1 * | 5/2005 | Loveland | 715/746 |
| 6,901,431 B1 * | 5/2005 | Dodrill et al. | 709/207 |
| 6,934,684 B2 * | 8/2005 | Alpdemir et al. | 704/265 |
| 2001/0055370 A1 * | 12/2001 | Kommer | 379/88.01 |
| 2001/0055963 A1 * | 12/2001 | Cloutier | 455/417 |
| 2002/0001370 A1 * | 1/2002 | Walker et al. | 379/88.04 |
| 2003/0037068 A1 * | 2/2003 | Thomas et al. | 707/200 |
| 2003/0050931 A1 | 3/2003 | Harman et al. | 707/100 |

* cited by examiner

VOICE APPLICATIONS AND VOICE-BASED INTERFACE

RELATED APPLICATIONS

The present application is a continuation-in-part of an application entitled "SYSTEM, METHOD, AND ARTICLE OF MANUFACTURE FOR HABITAT-BASED UNIVERSAL APPLICATION OF FUNCTIONS TO NETWORK DATA," and filed Jul. 16, 2001 under the Ser. No. 09/906, 382 and assigned to common assignee Clickmarks, Inc., and which is a continuation-in-part of an application entitled "SYSTEM, METHOD AND ARTICLE OF MANUFACTURE FOR WIRELESS ENABLEMENT OF THE WORLD WIDE WEB USING A WIRELESS GATEWAY," and filed Jun. 16, 2000 under the Ser. No. 09/595,781, which claims priority from Provisional U.S. Patent Application entitled SYSTEM, METHOD, AND ARTICLE OF MANUFACTURE FOR MULTIMODAL CONTENT ACCESS AND MANIPULATION, filed Jun. 7, 2000, each of which is incorporated herein by reference in its entirety and from which priority is claimed.

FIELD OF THE INVENTION

The present invention relates to audible computer interfaces, and more particularly to voice-based interactions with content and applications.

BACKGROUND OF THE INVENTION

Information on the web exists in the form of hyperlinks that appear in different web sites. A news site for example may contain headlines that are hyperlinks to their detailed exposition.

Custom Internet portals to display web-centric information exist (e.g., myYahoo, myLycos etc.). The level of customization is however, fairly minimal. In typical portals, the user chooses from a pre-determined set of headlines collected from a pre-determined set of web-sites. The user has no control over either the web-sites he/she gets the data from or the headlines that are taken from those web-sites. Further, the user has very little control over how the information is presented. Even further, the user has little or no control over how he or she interacts with the information.

A further problem is that a user currently has no way of applying functions universally to data collected on such a portal. For example, with the advent of mobile devices, the current shift in communications is to allow access to data on the Internet by mobile devices. Current methods of delivering web-based data to mobile devices, however, requires that each site have data formatted for display on the particular mobile device. Accordingly, a significant engineering investment is required on a web-site by web-site basis to enable each web-site to become mobilized. This is the biggest bottleneck in the mobile enabling of the web.

What is needed is a way to universally apply functions to all data (all content and applications) on the Internet, from any location in the world. In the mobilization example what is needed is a way to mobilize such data by aggregating user selected data at one site (e.g., a habitat) and making that selected data mobile-device enabled. The single site (habitat) thus behaves as a gateway between the wireless and wired web.

Prior art portals also fail to provide voice-based interaction with the content or applications in the portal. In particular, prior art portals have yet to provide the capability for speech-based interaction, including acting on a user's vocal commands and providing speech output. Thus what is needed is a way to allow the user to interact with any content/application dragged into a voice-enabled container. What is further needed is a way to create voice alerts that cause the user to be notified via a mobile device such as a telephone.

Utilizing the present invention, the entire world wide web and/or other network can be wireless/intelligence/speech enabled without requiring an engineering investment on a website by website basis.

SUMMARY OF THE INVENTION

A system, method and computer program product are provided for initiating a tailored voice application according to an embodiment. First, a voice application is installed at a server. A request to instantiate the voice application is received from a user. User-specific configuration parameters are also received, such as from the user or another application. An instance of the voice application is instantiated in a modified form based on the user-specific configuration parameters.

In one embodiment, permissions are set for specifying whether the user can instantiate the voice application. The instance of the voice application can be shared among multiple users. Also, configuration parameters specific to a second user can also be received. In such case, a second instance of the voice application can be instantiated in a modified form based on the configuration parameters specific to the second user.

According to another embodiment, additional configuration parameters are received from the user after instantiating the instance of the voice application. The instance of the voice application is further modified based on the additional configuration parameters. In an embodiment, some or all of the initial and/or additional configuration parameters can be read from a profile of the user, can be received from a user inputting the information, can be passed as runtime arguments, and/or can be fixed.

Multiple instances of the voice application can communicate with each other. Further, different types of voice applications, e.g., email voice application and address book voice application, can communicate with each other.

One type of voice application is used to audibly output content (text, audio, etc.) to the user. Preferably, the voice application is able to pause and resume the output. The pause can occur at a particular location in the content such as after each sentence or paragraph in text. In use, the pause can be initiated by the user and/or based on predefined parameters such as those entered in query string arguments. As an option, the pause can occur automatically, whereupon the user inputs a resume command. As a further option, the user may or may not be allowed to initiate a pause of the output. As yet another option, an elapsed time and/or a time before a timeout occurs can be output to the user when the output is paused. For example, these can be output one or more times, at random, at predetermined intervals, etc. Also preferably, the voice application is able to fast-forward and/or rewind output of the content.

Another type of voice application can be used to interact with an address book. A further type is used to interact with an electronic mail system, where such interaction can include hearing al new message, retrieving a summary of an inbox, receiving a summary of an email folder, receiving a summary of an email category, selecting a message, audibly outputting a message, creating a message, replying to a message, forwarding a message, and/or deleting a message.

Yet another type of voice application provides a security function.

A further type of voice application provides an alert. Such an alert can be set on data aggregated in a habitat, and/or can be sent upon occurrence of a specified event.

A system, method and computer program product provide a voice-based interface according to one embodiment. A voice application is provided for verbally outputting content to a user. An instance of the voice application is instantiated. Content for output is selected by a user, an application, by default, etc. The content is output verbally using the voice application. The instance of the voice application pauses the output and resumes the output.

The pause can also occur automatically based on some criteria or at a predetermined spot, and the user can input a resume command. Preferably, the pause occurs at a particular location in the content such as after each sentence or paragraph in text. In use, the pause and/or resume can be initiated by the user and/or based on predefined parameters such as those entered in query string arguments. As an option, the user may be prevented from initiating a pause in the output, but may be allowed to issue a resume comand.

As an option, an elapsed time and/or a time before a timeout occurs is output to the user when the output is paused. For example, these can be output one or more times, at random, at predetermined intervals, etc.

Preferably, the voice application can also fast-forward the output. The voce application preferably can also rewind the output.

Again, multiple instances of the voice application can communicate with each other. Further, different types of voice applications, e.g., email voice application and address book voice application, can communicate with each other.

Preferably, the voice application is customized based on user-specific configuration parameters, which can be read from a profile of the user, can be received from a user inputting the information, can be fixed, etc.

One type of voice application can be used to interact with an electronic mail system, where such interaction can include retrieving a summary of an inbox, selecting a message, audibly outputting a message, creating a message, replying to a message, forwarding a message, and/or deleting a message. Yet another type of voice application provides a security function.

A method for providing a voice habitat is also provided according to an embodiment. An interface to a habitat is provided. A user is allowed to aggregate content in the habitat utilizing the interface. A designation of content for audible output is received from the user. Some or all of the designated content is output. The user is also allowed to aggregate applications in the habitat utilizing the interface. Spoken commands are received from the user and are interpreted using a voice application. Commands are issued to one or more of the applications in the habitat via the voice application.

Preferably, the user is allowed to pause and resume the audible output. In one embodiment, at least a portion of the content is output using speech synthesis. Further, an advertisement can be audibly output to the user. The user can be allowed to designate views having content for audible output. A list of the content in the habitat can be audibly output.

The voice alert can be set on any data that was aggregated into the habitat. This allows the user to create voice alerts on data at websites that do not themselves provide this feature.

In another embodiment, a voice alert is sent to the user upon occurrence of a specified event. Preferably, the alert presents one or more options, such as forwarding the alert to a phone number, forwarding the alert to a person in a contacts list, faxing the alert to a phone number, and/or faxing the alert to a person in a contact list. The option(s) can be selectable by the user via spoken commands. Also preferably, the user is allowed to attach a voice message to the alert.

In one embodiment, the voice alert is sent to the user via a telephone. In a further embodiment, the voice application authenticates an identity of a user. As an option, the voice application can provide control of electronic mail functions. Further, the voice application may provide access to an address book. In an embodiment, the voice application is selected from a list of voice applications and dragged and dropped into the habitat.

A method for sending a voice alert is provided according to one embodiment. A designation of an alertable event is received from a user, an administrator, a configuration file, etc. Configuration parameters for configuring a voice alert are also received. When the event occurs, the voice alert is initiated. The voice alert, which includes speech and is configured using the configuration parameters, is sent to a user.

In one embodiment, the voice alert is sent to the user via at least one of a telephone call, an electronic mail message, and an instant message. Preferably, the configuration parameters include a telephone number to which the voice alert is sent. In another embodiment, the alert includes an option to go to a window from which the alert was generated.

In a further embodiment, the user is allowed to forward the alert to a phone number.

Preferably, the user can verbally input the phone number to which the alert is forwarded. In an even further embodiment, the user is allowed to forward the alert to a person in a contacts list, where the alert is sent to the specified person using information from the contacts list. In yet another embodiment, the user is allowed to forward the alert to a facsimile number, where the user verbally inputs the facsimile number.

DESCRIPTION OF THE PREFERRED EMBODIMENTS

Figure 1:
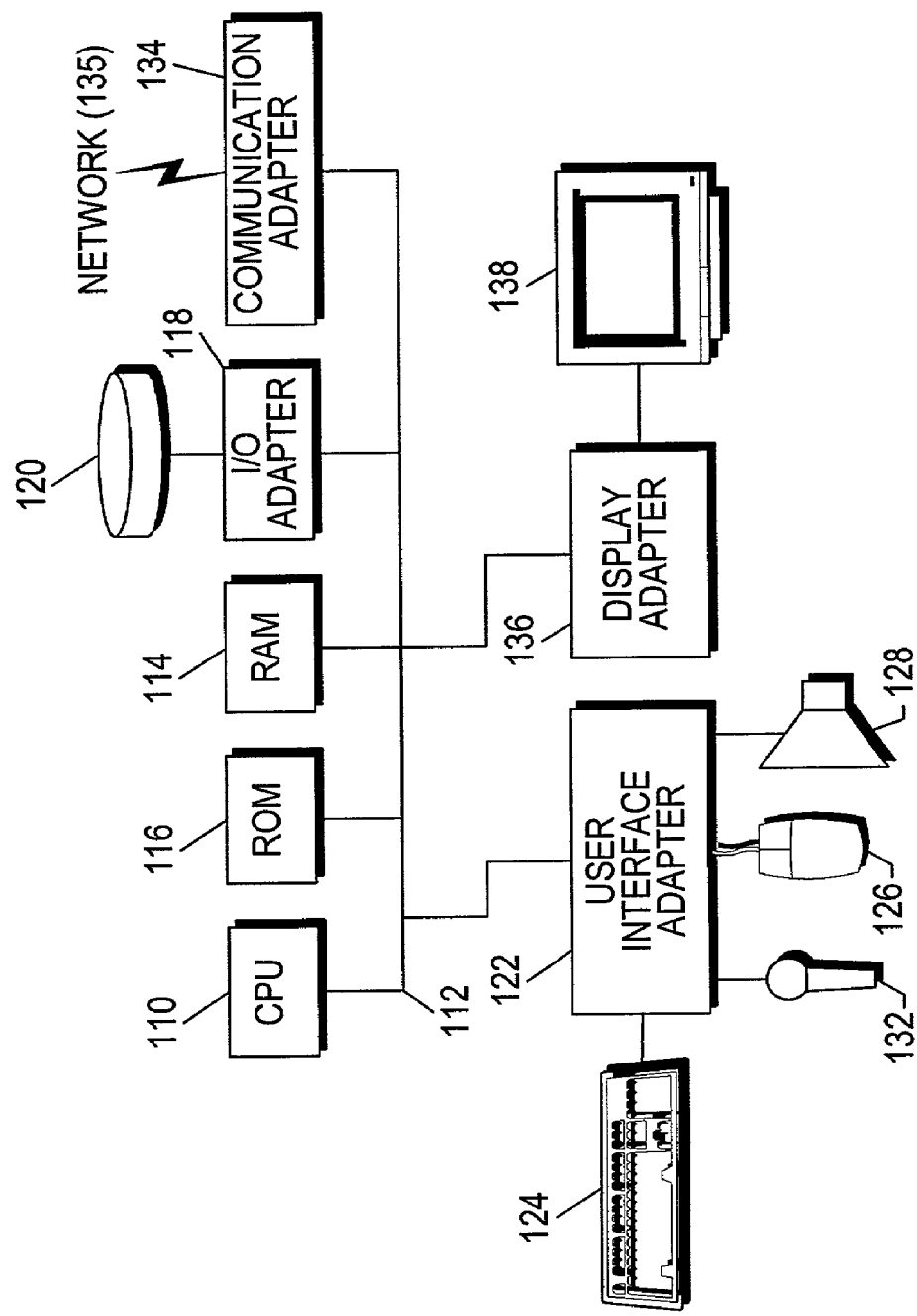
FIG. 1 illustrates a typical hardware configuration of a workstation in accordance with a preferred embodiment.

FIG. 1 illustrates a typical hardware configuration of a workstation in accordance with a preferred embodiment having a central processing unit 110, such as a microprocessor, and a number of other units interconnected via a system bus 112.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 328, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows Operating System (OS), the IBM OS/2 operating system, the MAC OS, or UNIX operating system. Those skilled in the art may appreciate that the present invention may also be implemented on platforms and operating systems other than those mentioned.

One embodiment enables personal data management and is able to aggregate data of one's choice and have it accessible on any device. More particularly, an embodiment enables wireless access of all services. Accordingly, a broad aspect of an embodiment of the present invention allows any user to send or receive the data of their choice from any device, in particular wireless devices including, but not limited to, Personal Digital Assistants (PDA's) and Wireless phones.

In this regard, one embodiment of the present invention includes the following parts:

1. A customizable information retrieval engine that allows users to aggregate data of their choice from any web site or data source in existence. The data includes but is not restricted to text (i.e. news headlines, hyperlinks in webpages), secure account information (i.e. email, bank accounts, utilities, and stock portfolios), services (i.e. maps, directions, weather, web searches), financial transactions (i.e. online shopping, buying, selling, trading, auctions, barters, comparisons), applications, and other dynamic tasks that involve interaction of the users with other web-based (client and server side) services or non web-based applications, content, etc.. Such data may be available through databases, corporate applications, existing legacy systems, etc. The aggregated data is displayed in a customized web-based habitat, which is amenable to presentation and data customization through an intuitive interface.

2. An interface of the above mentioned web-based habitat to a wireless enabling engine that takes the data of the habitat and renders them on all devices, especially wireless devices. All the data in the custom habitat is presented in a format that is supported by the mobile devices and therefore allows any data to become mobilized.

3. A voice-based interface to the above mentioned web-based habitat using one or more voice applications that audibly output data of the habitat, including output of text content via speech synthesis, and allow speech interaction with applications in the habitat, including receiving verbal commands.

The customized information retrieval engine allows the aggregation of any data into a customized web-based habitat and the wireless enabling engine takes all the data in the habitat and makes it mobile-device enabled. Therefore, one embodiment of the present invention allows the use of the above mentioned habitat as a conduit that allows any data on the web to become wireless enabled instantaneously.

Figure 2:
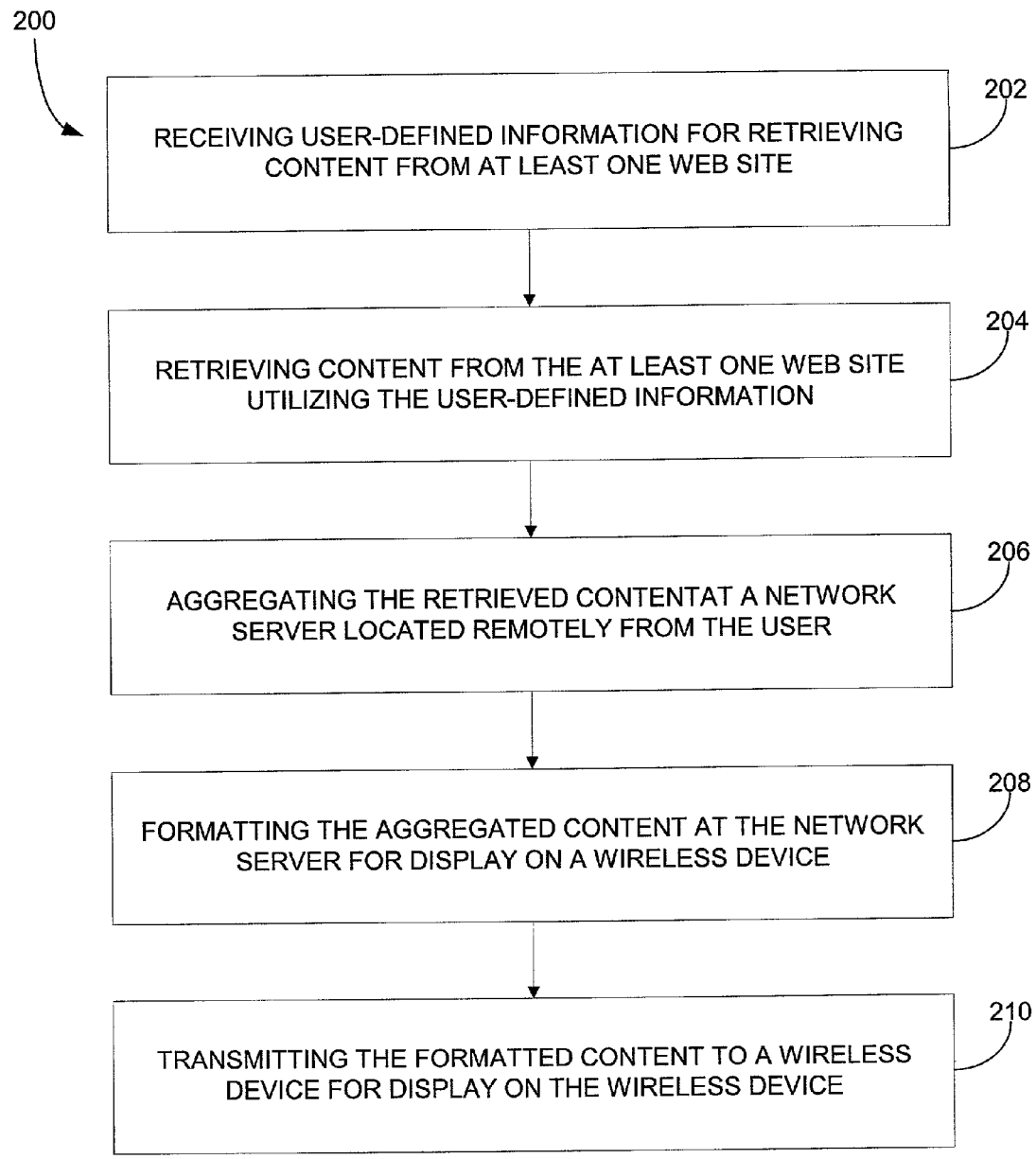
FIG. 2 illustrates a process for selection and formatting of web content for remote viewing.

FIG. 2 illustrates a process 200 for selection and formatting of web data for remote viewing. A user is allowed to provide information that specifies general or specific data to be retrieved for online or offline viewing. For example, the user can specify retrieval of a particular web page when the web page changes/is updated. As another example, the user can make a general request to download articles relating to a particular topic, such as stock exchange information, airline fares, etc. Preferably, the user is allowed to submit the user-defined information from at least one of the wireless device and a hardwired device such as a personal computer. It should be noted that such data can be anything on or transmittable via the Internet. By way of example only, such data can be hyperlinks, images, text, tables, secure information such as account information, email, audio and video data, data in HTTP and FTP, database-stored data, data in SMTP, applications, etc. The user is allowed to select, customize and/or edit the data from any device, wired or wireless.

The user-defined information is received in operation 202 and in operation 204 is used to retrieve data from one or more web sites. If particular data is specified in the user-defined information, the pertinent web page is accessed and the particular data is downloaded. If data is generally requested, a search engine can be used to find the information.

The retrieved data is aggregated at a network server located remotely from the user in operation 206. The network server acts as a habitat through which any data from the world wide web is collected and converted into a format amenable to the wireless device. Preferably, the aggregated data is amenable to presentation and data customization through a user interface. In operation 208, the data is formatted at the network server for display on a wireless device. The wireless device can include any type of device capable of receiving information where at least one of the communication links is wireless, such as a wireless telephone, Personal Digital Assistant (PDA), handheld computer such as a handheld PC, a pager, a device connected to a wireless modem, etc. The formatting style can be specific to the wireless device used by the particular user. Preferably, the data is formatted for display on a plurality of wireless devices so that the user can use any of a plurality of wireless devices to access the information. In operation 210, the formatted data is transmitted to a wireless device for display on the wireless device. If the data has been formatted for a plurality of wireless devices, the wireless device sends a request for a particular type of formatting associated with that type of device. Preferably, transmission cost and reliability, as well as transmission time, are customizable and are user-customizable.

In one embodiment of the present invention, a user selects which data is aggregated in real time. As an option, customization of the web-based habitat can be performed utilizing the wireless device or a computer of the user.

In another embodiment of the present invention, the data is aggregated on a portal page unique to the user. The portal page displays the data that the user has specified, and can include the interface that allows the user to specify the information. This portal page is fully customizable by the user and can be accessed by any device, whether wireless or hardwired. As an option, the retrieved data can be updated after a predetermined amount of time has expired. The data would then be retrieved, formatted, and transmitted to the wireless device.

In an embodiment of the present invention, the user is allowed to interact with the data. Thus, the user is not only able to receive information, but is also able to send information from the wireless device. For example, the user can be allowed to fill out forms and fields, make purchases (buying and selling), read and reply to emails, etc. using the wireless device.

Alerts

In one embodiment of the present invention, an alert is sent to a mobile device upon occurrence of a prespecified condition or criteria. Such alert may be outputted based on any desired predetermined criteria. Further, the predetermined criteria may be applied to the aggregated data, or portions thereof. In one embodiment, the criteria and/or portion of the aggregated data may be user-defined.

The alert may include any type of alert, such as for example, a textual alert, an audible alert, a voice alert including a spoken message (human or synthesized), or any combination of these. See also the section below entitled Voice Alerts for more information on audible alerts.

According to one embodiment of the present invention, any data that is pulled into the habitat is alertable. The data can be from any web based content, web based application or non-web content, and can also be from a non-web application. As an option, the alert may be output using push and/or pull technology.

Data that is pulled in from applications is usually in the form of tables, pointers or links. Alerts can be set on any cell of the table or any link. There are various criteria that can be set so as to trigger such an alert.

For numerical values, the criteria can be a simple threshold (upper limit, lower limit, equal to or not equal to).

Or it can be a complex Boolean expression comparing a number of cells in a table (if a<b and c<d or c=100).

Or the alert can be set on a string. If the keyword matches any word in the string then the user will get an alert. The aforementioned predetermined criteria may require that a value and/or string (i.e. keyword, data, etc.) of the aggregated data match a predetermined value and/or string. Further, the predetermined criteria may include a time, and be expanded to include a Boolean expression.

Along with the threshold, Boolean or keyword, the user can also set the time frame in which the alert can be sent, e.g., once the criteria is met, send the alert between 8 am and 9 pm only Monday to Friday. By way of example only, an alert can be sent at a predetermined time prior to departure of an airline flight. The alert can also be a reminder of an appointment. Further, an alert can be sent upon a stock price reaching a predetermined level or an auction price reaching a certain amount.

The user also has the ability to set the polling time for the alerts. In other words, if there is data which only changes every hour, then the user can set the polling time to check for the new data every hour. In another case where the data changes very frequently (stocks) the user can set the polling time for every five minutes, for example.

The user also has the ability to customize the message by alert. The user can enter in a piece of text that will be sent out with the alert. For example, an alert can be customized to include text such as "Inventory low call Robert at 510-998-7654." For voice alerts, the user can specify a .wav file as well. Using the aforementioned Boolean expression, various combinations of criteria may be employed together to prompt the alert.

The user also has the ability to send the alert out using different delivery channels, such as email, pager, SMS, fax, etc. The user also has the ability to send the alert to multiple recipients.

Optionally, a generic message alert may be utilized, including a speech-synthesized alert. Moreover, a plurality of generic message alerts may be available for a plurality of particular applications, i.e. flights, stocks, etc. Still yet, the generic message alerts may serve as templates which can be specifically tailored by the user for various situations. In the alternative, specific messages may simply be appended to the generic message alerts.

Figure 3:
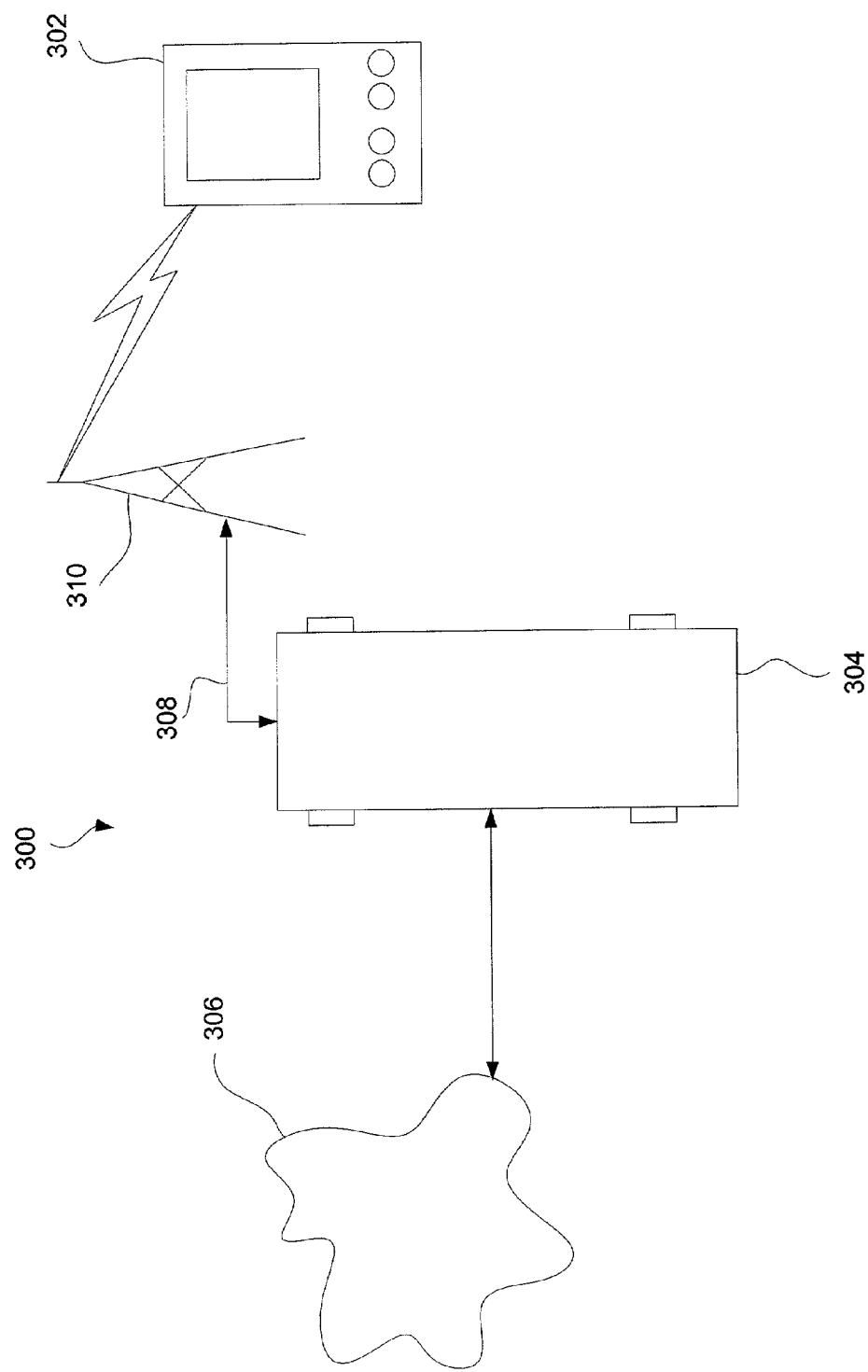
FIG. 3 depicts a preferred operating environment for one or more portable wireless devices in connection with a host computer system.

FIG. 3 depicts a preferred operating environment 300 for one or more portable wireless devices 302 in connection with a host computer system 304, where the habitat is stored and manipulated. The host computer is connected to remote sources of data information on the Internet 306.

The host computer system preferably includes a peripheral interface adapter that provides for the bi-directional transfer of the data via an interconnect line 308 to an external transceiver 310 that supports wireless communications with one or more wireless devices. The transceiver, in a simple embodiment, implements a low-power 900 MHz or 2.4 GHz transceiver for short-range communication with the wireless devices. In a preferred embodiment, however, the transceiver is part of a cellular or digital telephone network that allows communication between the host computer and the wireless devices at great distances, including geographically remote locations.

The present invention allows a user to create an information portal whose source and data is completely customizable. Information on the web exists in the form of hyperlinks that appear in different web sites. A news site for example may contain headlines that are hyperlinks to their detailed exposition. In typical portals, the user chooses from a pre-determined set of headlines collected from a pre-determined set of web-sites. The user has no control over either the web-sites he/she gets the data from or the headlines that are taken from those web-sites. The present invention allows the user to completely configure both the source and data that he/she wants on his/her own portal.

According to a preferred embodiment of the present invention, the user is presented with a page that contains the user's information of choice from an arbitrary number of different sources and presented in a completely customizable format. The page consists of different "views" where each view in turn contains multiple windows. The number of views and the number of windows in each view can be configured.

Another embodiment of the present invention includes the following parts: (a) An interface that displays the user customized information, (b) an interface that allows the user to select and manage the information of choice, (c) a mechanism for marking selected information contained in a web-page (d) a method for communicating that information to the backend servers that process and store that information, (e) a mechanism for the storage of the selected information (f) a mechanism for regularly retrieving selected information and (g) a mechanism for checking for change in the data or the format of the selected sources of information.

A User Interface to Display Preferred Data.

The user interface comprises "views", each of which contain multiple windows. The number of windows in a view is completely configurable. The user may create or delete as many views as he/she may desire. This user interface allows a user to cleanly categorize related information within individual windows and views. This provides a user one place to access all of his/her favorite information and data from the web. This data includes (but is not limited to) (a) News and Information headlines (of all sorts) (b) Information about email, bank and other accounts (c) Information about shopping and comparison of rates and prices (d) Graphs, Images, Sounds or any other media.

This data is presented to the user with an ability to edit and manage it intuitively and interactively. Some of the features of the management process include (a) a presentation of the user's selected information over a configurable number of days in the past (b) an ability to select, maximize, minimize, refresh or edit the data of individual windows (c) to "publish" user's views into a directory of views and (d) to share these views with other people by emailing them the views.

An Interface for Selection and Management of Preferred Data.

The interface that allows the user to create his/her customized portal is based on an intuitive drag and drop capability. The user simply selects the sources or headlines of choice and drags and drops them into windows and views of choice. The drag and drop feature also makes customization very easy for the user, allowing quick compilation and management of their preferred data. There are two levels of selection and management provided, default and advanced.

Figure 4:
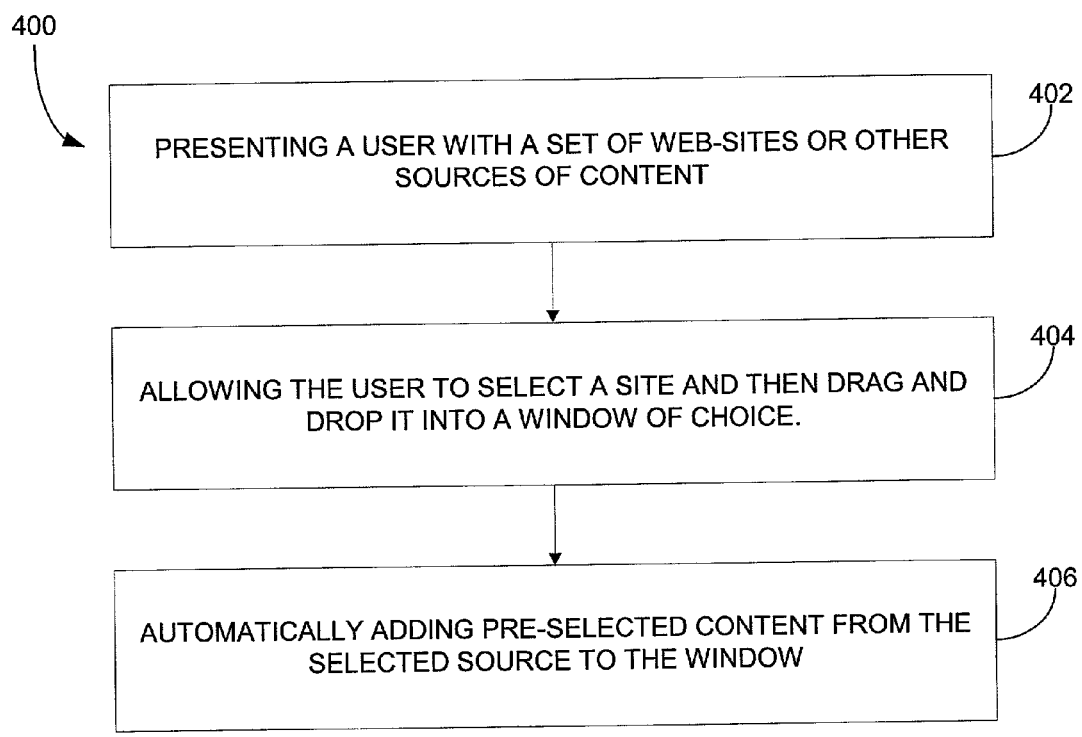
FIG. 4 depicts a default mode process for allowing selection and management of preferred content according to one embodiment.

Referring to FIG. 4, in a default mode process 400 for allowing selection and management of preferred data according to one embodiment of the present invention, a user is presented with a set of web-sites or other sources of data in operation 402. In operation 404, the user is allowed to select a site and then drag and drop it into a window of choice. Once that is done, pre-selected data from that source is automatically added to the window in operation 406.

Figure 5:
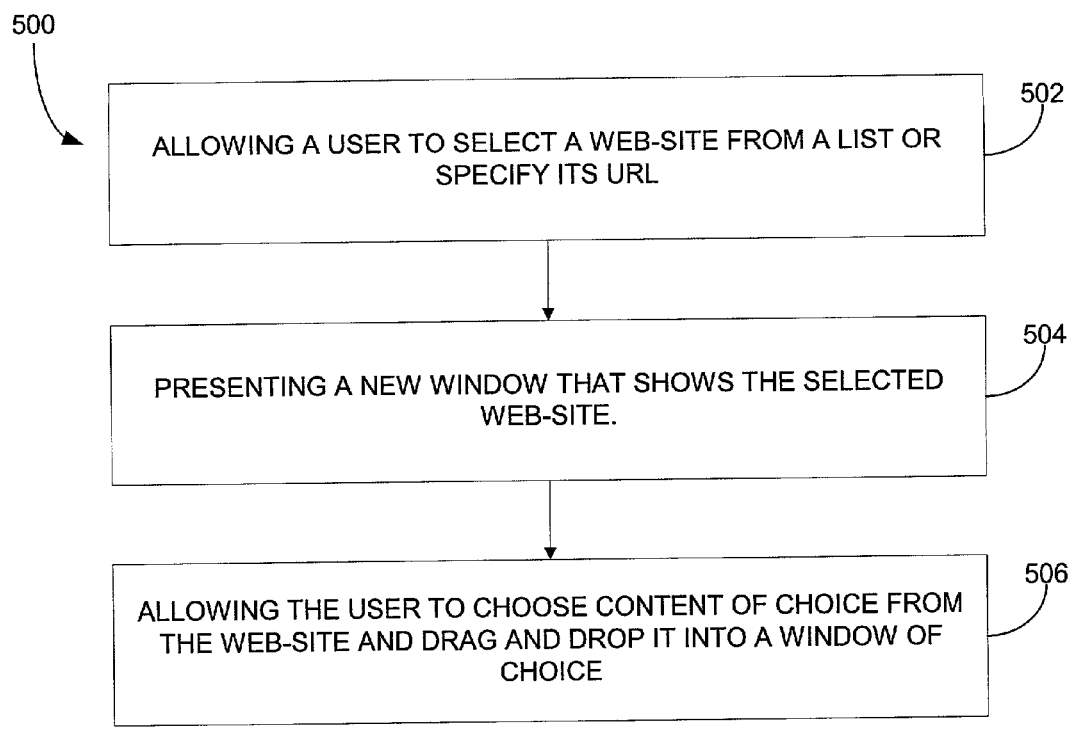
FIG. 5 is a flowchart of an advanced mode process for allowing selection and management of preferred content according to an embodiment.

FIG. 5 is a flowchart of an advanced mode process 500 for allowing selection and management of preferred data according to an embodiment of the present invention. In operation 502, a user is allowed to select a web-site from a list or specify its URL. A new window is presented in operation 504 that shows the selected web-site. In operation 506, the user is allowed to choose data of choice from the web-site and drag and drop it into a window of choice.

In a preferred embodiment in which the user is allowed to drag and drop information and/or applications into the habitat, the system first establishes communication with a website, scans the website, understands the data on the website, then parses the website. The user drags and drops data from the parsed page. In this way, more than just static content can be placed in the habitat.

A Mechanism for Tagging Selected Information Contained in a Web-Page.

Web-pages are created using HTML (Hyper Text Markup Language). The data in a web-page is formatted using a tabular format where each table is composed of individual cells distributed into a number of rows and columns. A table may contain other tables within its individual cells. The tagging of selected information within a web-page hinges upon assigning an address to each item of data within the web-page. The addressing scheme takes into account the table(s), row(s), column(s) and cell(s) an item of data belongs to. An item of data can be identified by its address within a web-page and (ii) all the addressing schemes that take into account the table(s), row(s), column(s) and cell(s) an item of data belongs to. The addressing scheme works as follows:

The page is viewed to be composed of tables that may themselves contain other tables. The tables that are not contained in any other table (highest-level tables) are assigned identifying numbers starting from 1. Tables contained within the highest-level tables are assigned numbers that take into account the tables that contain them. If a table is not contained in any other table, then it may be assigned a number, say 3. If table number 3 contains two tables, then they will be assigned numbers 3-1 and 3-2 respectively. Each table is composed of a unique number of rows and columns. Each item of data resides within a cell that belongs to a specific row and column of a table. The complete address of an item of data is then the unique identifier of the table that contains it and the position of that item of data within that table.

Once the address of selected data is determined, it is converted into a hyperlink that contains the original data or a hyperlink to it, and its address. When a user drags and drops that selected data into a window of choice, that hyperlink and all of its associated information is sent through the window to the servers where it is entered into a database.

This mechanism also allows a capture of configurable sections of a web-page, including individual words, lines, paragraphs, etc.

In the case of secure information like email or bank accounts, the mechanism followed is as follows:
1. First forms are created to allow a user to log into their accounts. These forms consist of (a) Dynamic information (like the user name and password) which is captured during the session (b) Static information that is required by the remote account server which is stored in a database and retrieved when an account is selected.
2. Using the dynamic and static information, the server logs into the remote server.
3. The account information is retrieved.
4. The account information is presented in a suitable and configurable format.

A Mechanism for Local Storage or Caching of Selected Data.

The selected information is cached or stored locally to enable a faster access. Once a web site is selected by a user, a copy of the site, including text and images, is kept locally in the servers. When any user requests a page that has been requested before, the cached copy is presented if the data of the site has not changed since the time the page was cached. The process is broken down into two: Simple and Customized addition of data:

Addition of Default data: The addition of default data proceeds as follows:
1. Once a site is selected, the backend identifies the headlines that have been pre-selected for that site.
2. The server queries the database and picks up the default headlines.
3. The headlines that are not included in the pre-selected data are not included.
4. The server contacts the ActiveX control that constitutes the administrative page and communicates the selected headlines.
5. The selected headlines are visible in the ActiveX control and are also accessible to the main user interface.

Addition of Customized data: In the case of addition of customized data, the process is as follows:
1. The user selects a hyperlink by dragging and dropping them into the ActiveX control on the Administrative page.
2. The hyperlink and related information are sent to the servers. The information includes (a) the data of the link, (b) its location on the page, (c) the URL of the site, (d) the identity of the window and the view it has been dropped into and (e) the user name.
3. Once the link has been selected, it is added to the database and is accessible to the main user interface.

A Mechanism for Communication of Selected Information to the Backend Servers.

Once a hyperlink is dropped into a window, information is passed by the window to the backend servers. This information includes the address of the hyperlink, as defined above. In addition, the information about the window and the view containing that window is also sent to the server. This information is then used by scripts to generate the front page in HTML.

A Mechanism for Regular Retrieval of Preferred Data from Selected Sites.

The power of the current invention is that refreshed data is retrieved from the selected sources of information as they are updated. The sources of information, or web sites, selected by users are cached locally. The web pages stored locally are categorized according to the number of times they are requested. High request sites are retrieved once every few hours, for example.

A Mechanism to Check for a Change of Data or Format in the Selected Sources of Information.

Once a page has been requested by a user, it is retrieved on a regular basis. There are two checks performed to find out a change in the information in the page. The first involves a change in the data of the page and the second a change in the format in which the data is presented.

Change in a Page's Data:

Every time a page is retrieved, a copy is kept locally on servers. Once a page is automatically retrieved, the data from the newly retrieved version of the page is compared to the data from a previous version of the page. If there is a change in the data, then the updated data is retrieved.

A Change in the Format of the Data:

The formatting of the data in a page is stored in terms of a complete addressing scheme for the page, which specifies the breakdown of the page into its sub-sections. Once there is a change in the formatting of the page, then the relations of different sub-sections of the page to their parent sections change. A mechanism is implemented that keeps track of the number of differences between the format of a previously stored version of the page and the newly retrieved version. An alert is sent to the users if the number of differences is greater than a configurable number. Note that noise reduction mechanisms may be employed to, for example, eliminate the problems that could be encountered if the addressing of a page changes, such as causing disarray in the addressing scheme.

A customizable information retrieval engine has thus been described that allows users to aggregate data of their choice from any web-site in existence. The data may include, but is not restricted to: text (i.e. news headlines, hyperlinks in web-pages), secure account information (i.e. email, bank accounts, utilities, and stock portfolios), services (i.e. maps, directions, weather, web searches), financial transactions (i.e. online shopping, buying, selling, trading, auctions, barters, comparisons) and other dynamic tasks that involve interaction of the users with other web-based (client and server side) services. The aggregated data may be displayed in a customized web-based habitat, which is amenable to presentation and data customization through an intuitive interface.

Voice Functionality in the Habitat

The Voice Habitat according to one embodiment is a modified Habitat which provides several functions, including:

Providing a hosting environment for VoiceLets. A VoiceLet is a voice application, or more particularly, a piece of voice application functionality that can be added to the habitat and configured to provide the functionality to the end user. For example, an email access VoiceLet can be dragged into the habitat by the end user, and configured to access the user's email inbox. The user can then access email via the voice habitat. A detailed description of voicelets is provided below.

Allowing the user to interact with any content/application dragged into a voice-enabled container.

Creating alerts that cause the user to be notified via a voice telephone call.

The following features may be added to the Habitat, among others:
1. Voice Authentication—The user is authenticated using a PIN, user name, or combination of the two. The user can be authenticated using their voice print (speaker verification), or in the case of a limited set of users, the user can be identified using their voice print (speaker identification).
2. Voice Enabling Containers—The user can specify for a given container (View or Window) whether or not that container should be voice enabled when the user dials in.
3. Voice Enabled Content—When calling up, the user can select to listen to content items (both text or audio files) dragged into the habitat, and interact with applications aggregated into the habitat using VoiceLets.

The user may access the voice habitat by calling in to the habitat via telephone, connecting using Internet telephony, etc. Note that the user can also access the habitat using any other device as well, such as computer, PDA, etc.

Figure 6:
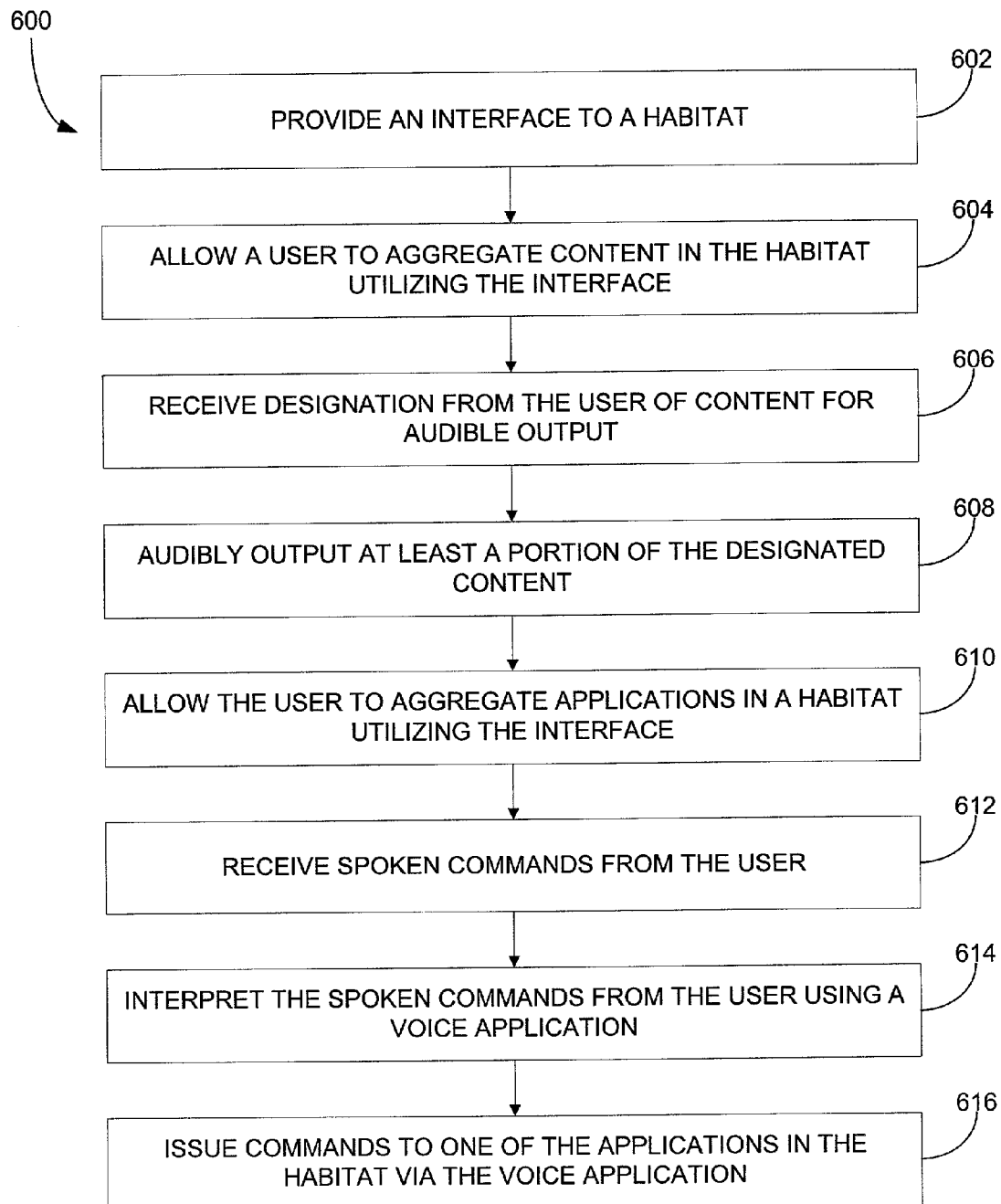
FIG. 6 is a flowchart of a process for providing a voice habitat according to an embodiment.

FIG. 6 is a flowchart of a process 600 for providing a voice habitat according to an embodiment. As shown, an interface to a habitat is provided in operation 602. In operation 604, a user is allowed to aggregate content in the habitat utilizing the interface. A designation of content for audible output is received from the user in operation 606. Some or all of the designated content is output in operation 608. In operation 610, the user is also allowed to aggregate applications in the habitat utilizing the interface. Spoken commands are received from the user in operation 612 and are interpreted in operation 614 using a voice application. In operation 616, commands are issued to one or more of the applications in the habitat via the voice application.

User Verification

According to one embodiment, a user can supply a Personal Identification Number (PIN) to authenticate that he or she is authorized to access the habitat and/or certain aspects of the habitat. Alternatively or in addition to entering PIN information, the user can be authenticated by voice verification technology that authenticates the user based on characteristics of the user's voice, such as by having the user utter a spoken pass phrase that is then matched to the user's voiceprint.

Account Number Selection during User Registration

As an example of use, when the user first registers to access his or her habitat using voice, the user can be asked to provide an account number. This can be any number the user chooses, and optionally, the interface may suggest that the user choose a memorized telephone number, birth date, etc. The account number can be unique, and the system verifies that the number is unique after the user submits his or her profile for registration. If the number is not unique, the user is prompted to enter a different number.

The user can register using a desktop web browser by navigating to a specified URL. This URL is made available in the habitat, under a "My Wireless" tab or equivalent. Alternatively, the user can be allowed to register entirely by speaking into a telephone.

PIN Selection during User Registration

In an embodiment using PIN verification, after entering the account number, the user is asked to supply a 4 digit PIN. The user is asked to enter the PIN twice to ensure correctness. The PIN is verified to be numeric, alphanumeric, etc. and, optionally, at least n digits long. The PIN is stored in the user profile in encrypted form, like the password. The user may also change her existing PIN number by providing the original PIN number, and the new PIN number (twice), for example.

Authentication

When the user accesses the habitat using the voice interface, he or she is asked to vocally state his or her account number. Alternatively, the user can key in the account number using the telephone keypad, computer keyboard, PDA interface, etc. Next, the user is asked to supply the PIN. Again, the user can speak the PIN, or key it in using the keypad. If the authentication succeeds, the list of containers (Views) the user can choose from is verbally output to the user. See the section below entitled User Authentication VoiceLet for details on the particular VoiceLet that enables this functionality.

Voice Enabled Views

Figure 7:
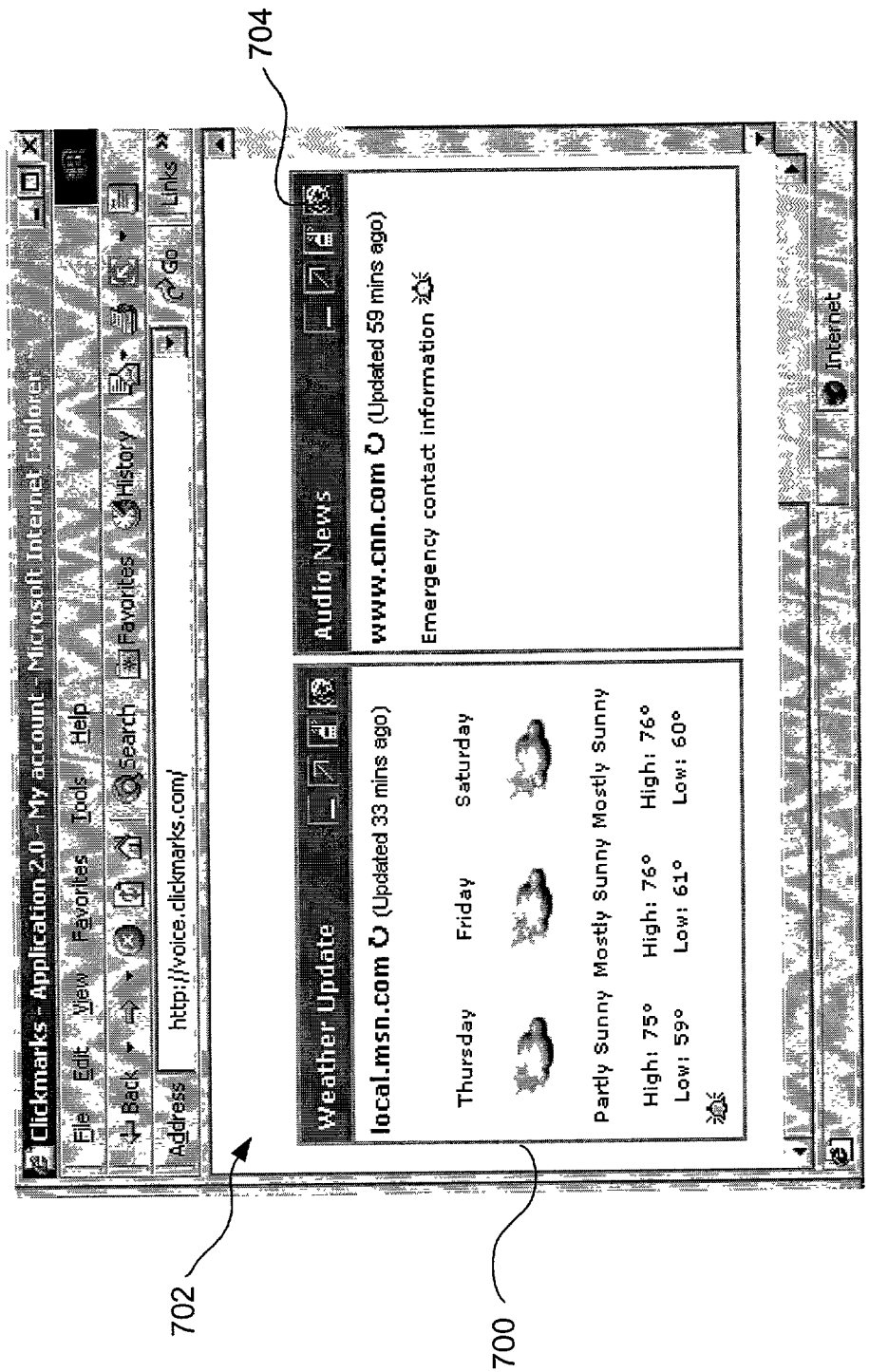
FIG. 7 depicts a voice enabled view according to one embodiment.

When the user first logs into his habitat, an audio advertisement can be output to the user, followed by a list of all the voice-enabled views in the habitat. When the user selects a particular view from the list, he is taken to the Voice Enabled Window dialog. For example, as shown in FIG. 7, a window 700 in a view 702 can be voice enabled when the user, on a main page, clicks on a "Voice Enable" icon 704 in the window. If no windows are available in the view, the user is presented with a message to that effect, and taken back to the list of views.

Audio Prompts

If the name of the view or window has been recorded, the recorded version of the name can be output to the user. Recorded names may be stored in files with the name of the view or window, in a specified directory.

If a recorded version of the view or window name is not found, the view or window is read using a Text To Speech (TTS) engine. Thus the menu can be composed of a series of audio prompts, followed by a series of text prompts.

Additional audio prompts may be supplied by the application, e.g. "welcome.wav".

Grammars

Grammars for recognizing user input are read in from a resource file by the application, and passed to a voice processor for generating a representation of the grammar in the VoiceXMLmarkup language, which is referred to as VoiceXML herein. This allows the grammars to be changed during tuning, and application design, without changing the code. Also, different grammars can be specified for different human languages, thus allowing the application to function regardless of the human language spoken by the user.

Voice Enabled Windows

Figure 8:
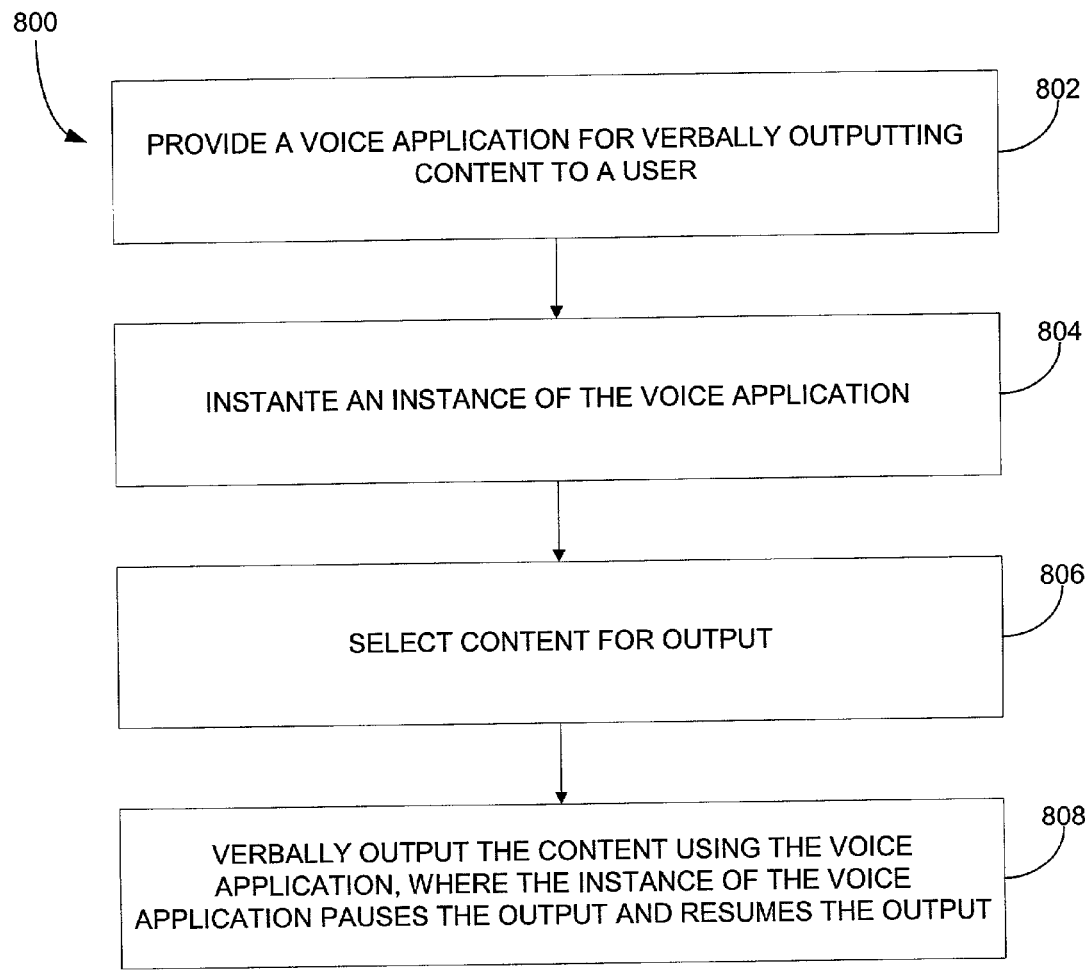
FIG. 8 is a flow diagram of a process for providing a voice-based interface according to one embodiment.

FIG. 8 is a flow diagram of a process 800 for providing a voice-based interface according to one embodiment. A voice application is provided in operation 802 for verbally outputting content to a user. An instance of the voice application is instantiated in operation 804. Content is selected for output in operation 806, as directed by a user, an application, by default, etc. In operation 808, the content is output verbally using the voice application, which also has the capability to pause the output and resume the output, as well as fast-forward/rewind the output.

When the user enters a voice-enabled window, some or all of the content in that window is audibly output to the user via audio replay and/or speech synthesis, preferably in the order in which it occurs. The user can direct the system by giving commands that can, for example, cause the system to skip the content and move on to the next content.

If no content is available in the window, the user can be presented with a message to that effect, and taken back to the list of windows, to the next window, etc.

Voice Enabled Content

When the user listens to the content in a window, what is output to her depends on the type of content:

1. Headlines—The user hears the headline, followed immediately by a reading of the summary of the corresponding article.
2. Tables—The user hears the contents of the tables, with the headers repeated.

More details regarding management of table data is provided in U.S. patent application entitled SYSTEM, METHOD AND COMPUTER PROGRAM PRODUCT FOR PAGE RENDERING UTILIZING TRANSCODING, filed Aug. 28, 2001 under Ser. No. 09/942,051 and assigned to common assignee, Clickmarks, Inc., and which is herein incorporated by reference for all purposes.

3. Audio files—Any audio file dragged into the habitat can be automatically converted when refreshed, so that the user can listen to the file regardless of its format. Thus, for example, a .wav file or an MP3 file can be played back to the user on the user's listening device.

Voice Alerts

Figure 9:
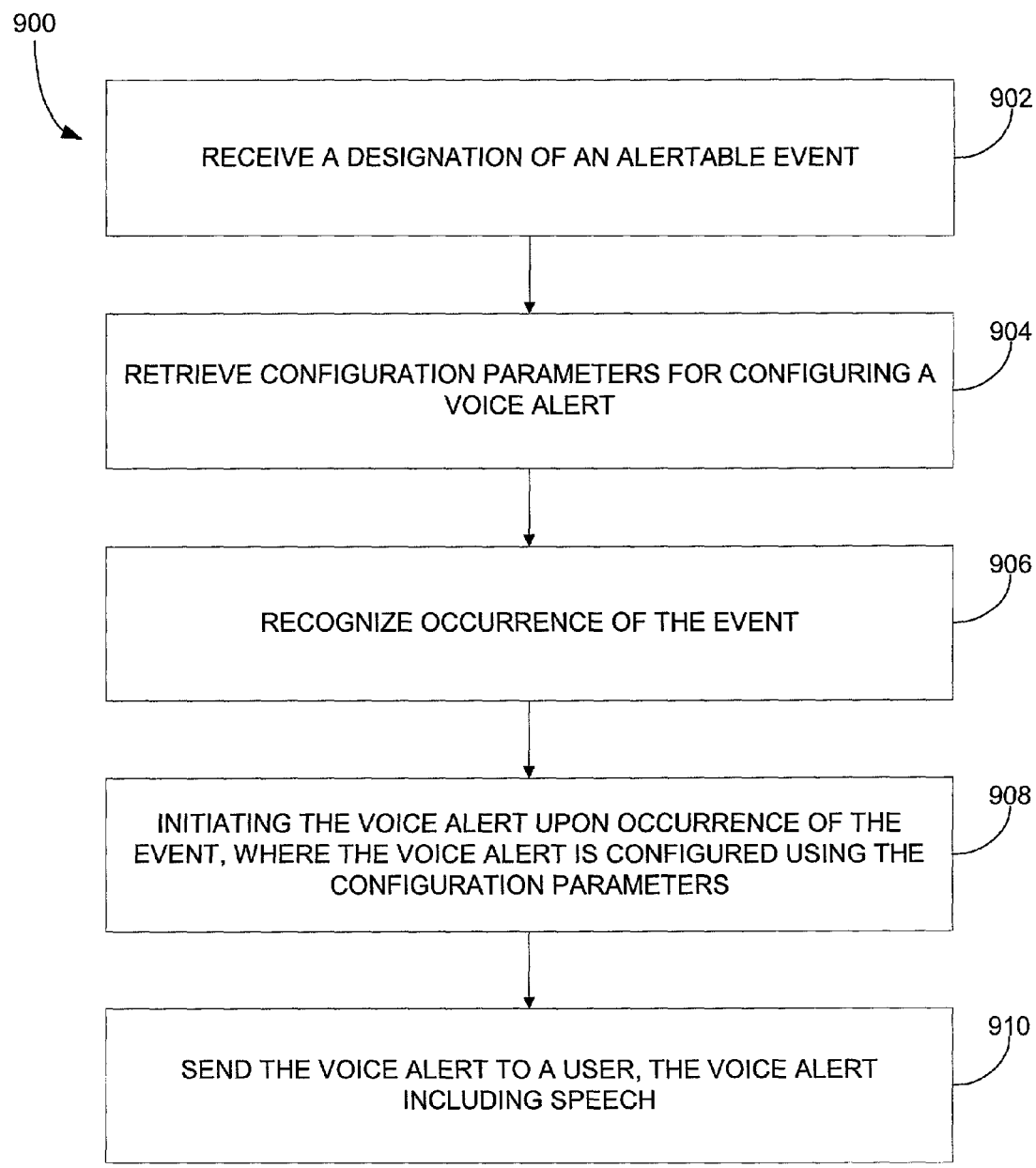
FIG. 9 depicts a process for sending a voice alert according to one embodiment.

FIG. 9 depicts a process 900 for sending a voice alert according to one embodiment. In operation 902, a designation of an alertable event is received from a user, an administrator, a configuration file, etc. Configuration parameters for configuring a voice alert are received in operation 904. In operation 906, occurrence of the event is recognized, and in operation 908, the voice alert is initiated. The voice alert, which includes speech, is configured using the configuration parameters and sent to a user in operation 910.

The voice alerts feature allows the user to set an alert, and have notification sent via a voice telephone call, email, instant messaging, etc. See the section entitled Alerts, above, for more details on setting alerts in the Voice Habitat.

Setup

When creating the alert, the user can select from a set of previously entered phone numbers (stored in the user profile) or the contact in Outlook. When a notification is sent, the phone number is called, and when answered, the message is played back.

Notification

In one embodiment, when the alert rules match, the system places an outbound telephone call (or sends some other type of notification) to the user on the specified number. The user hears a message. Preferably, the user is given the option to go to the window from which the alert was generated (even if the window is not voice enabled).

The alert may also be interactive, and preferably presents the user with the following options:
1. Forward this alert to a phone number (user verbally inputs the phone number)
2. Forward this alert to a person in contacts list (user speaks in the contact name)
3. Fax this alert (same options as 1 and 2 above).

As an option, if the user selects option 1 or 2, she is given the option to record a short message to attach to the alert.

VoiceLets

VoiceLets are reusable voice applications that can be hosted in the habitat, or accessed independently of the habitat, and are used to quickly provide useful applications to the end user. Each VoiceLet can be implemented as a plug-in module which is configured by the administrator and/or the end user, and which presents its interface entirely in voice, using a VoiceLet API (discussed below). As an option, some or all of the VoiceLets can be optimized and tuned to perform specific tasks.

VoiceLets can provide, for example, access to internet, POP3 and MAPI email systems, LDAP or MAPI compliant directory systems, text or audio content, etc. Each VoiceLet can be developed and tuned to provide an optimal user experience, thus saving the developer the time and effort of re-creating that interface. VoiceLets can be fully configurable by both administrators and end-users, and can be easily incorporated into a larger voice application, particularly when implemented as VoiceXML sub-dialogs. The VoiceXML for the VoiceLet can be generated by a transcoder at run-time, and can be formatted by a transcoder to maximally utilize the capabilities of the particular VoiceXML browser that is used to access the VoiceLet. This provides more certainty that the VoiceLet will work correctly regardless of the VoiceXML platform used to deploy it, without sacrificing any of the benefits of that particular VoiceXML platform.

Illustrative VoiceLets that can be used with the voice habitat include:
1. User Authentication—Authenticates a user accessing the Habitat or some other voice application.
2. Audio Advertisement—Plays back an audio advertisement to the user.
3. Email—Provides access to an email inbox and other email functions.
4. Address book—Provides access to address book and directory services.
5. Content—Wraps a specific piece of content, e.g. news/entertainment/finance, driving directions, etc
6. Security—Front-end for any username/password based account. Used to additionally protect access to sensitive user data.
7. Exit—Allows the user to gracefully exit the Habitat.

Each of these is discussed in detail below. Note that the list above is not exhaustive, as many different types of applets can be created using the precepts of the present invention.

An illustrative life-cycle of the VoiceLet is as follows:
1. VoiceLet type creation—A new type of VoiceLet is created by a developer, using the VoiceLet API. The new VoiceLet type is installed at the server and permissions are set on who can instantiate this type of VoiceLet.
2. VoiceLet instantiation—A VoiceLet is created by an administrator or potentially by an end user using the VoiceLet instantiation tool. This tool can be incorporated into an application such as the Habitat. The user is asked to specify the type of VoiceLet they wish to create (e.g. Email, Address Book, etc.), and is then asked to specify any configuration parameters needed (as described below).
3. VoiceLet access—Once instantiated the VoiceLet is assigned an identifier (ID), and can be shared with other users in the Habitat. When it is accessed, additional query parameters may be passed to it, further controlling its behavior.

Figure 10:
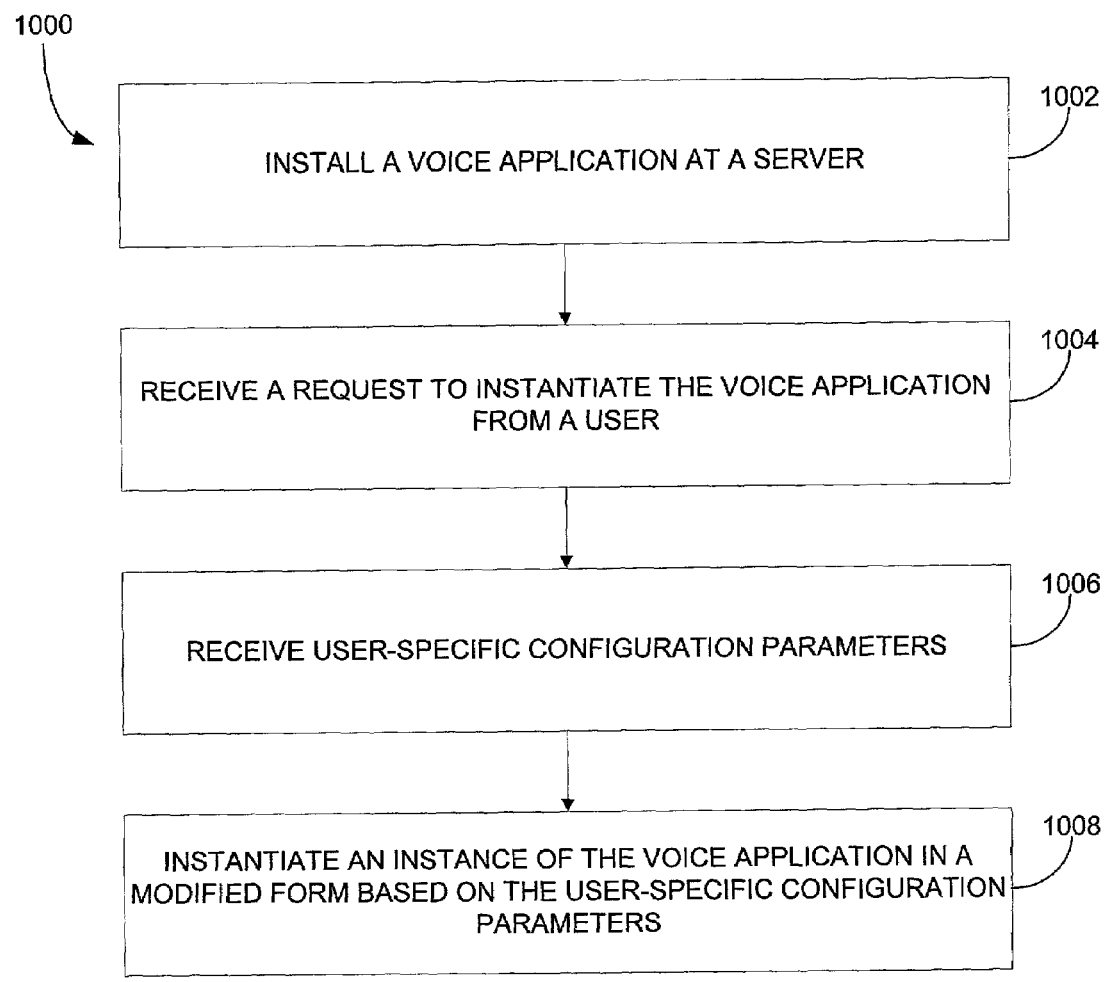
FIG. 10 is a flowchart depicting a process for initiating a tailored voice application according to an embodiment.

Accordingly, FIG. 10 depicts a process 1000 for initiating a tailored voice application according to an embodiment. In operation 1002, a voice application is installed at a server. A request to instantiate the voice application is received from a user in operation 1004. In operation 1006, user-specific configuration parameters are received, such as from the user or another application. In operation 1008, an instance of the voice application is instantiated in a modified form based on the user-specific configuration parameters.

VoiceLet Configuration

VoiceLets may be configured using any combination of:
1. Fixed Configuration—This is a set of parameters that are specified when an instance of the VoiceLet is first created or activated. These are stored in a file as name-value pairs, and are read by the VoiceLet whenever it is invoked.
2. User Configuration—This is a set of parameters that are read from the user profile.
3. Query Arguments—These are passed to the VoiceLet on the command line or as query arguments when invoked from the device. These can be changed with each invocation of the VoiceLet if desired.

Fixed Configuration Parameters

When a new instance of a VoiceLet is created, some parameters which the VoiceLet may need in order to run are specified up front. For example, an Email VoiceLet can be configured to always access a particular mail server. This eases the burden on the user and the administrator, as the user does not have to enter the mail server when he configures the VoiceLet. Further, in the email example, the administrator can designate additional parameters (username and password) as coming from the user profile, so that the user doesn't have to do anything to configure the VoiceLet (explained in more detail below).

User Profile Parameters

According to one embodiment, user profile parameters are read from the current user's profile by the VoiceLet while it is running. So, for example, the username and password required to access the email server can be read from the user profile by the Email VoiceLet. When the administrator creates the VoiceLet, he/she can specify certain fixed parameters, and designate other parameters as coming from the user profile. This automates the process so that the end user does not need to do any further configuration when he/she uses the VoiceLet.

Query String Parameters

When a VoiceLet is invoked, query string arguments can be passed to control the behavior of the VoiceLet. The sections below describe the shared query arguments, which can be used with any of the VoiceLets described in this document. Default values for these parameters can be provided when the VoiceLet is instantiated, but the query string values would override the defaults if present. If no defaults and no query string parameters are present, system defaults can be used.

Grammars and Prompts

Preferably, the VoiceLet dialogs make use of pre-recorded text for user prompts, help, etc. These can be shared across the VoiceLets as much as possible to give a consistent "sound & feel" to the application. As an option, each VoiceLet can be invoked in a specific language using the ISO 639 language and ISO 3166 country codes. The VoiceLet uses this information to load the appropriate grammars and prompts for the specified language. All grammars and prompts can be stored in a single VoiceLet configuration directory, with sub-directories for each locale (language/country). The default is in a root directory. For example, a configuration might look like this:

InboxGrammar.gram
InboxPromptl.wav

The same grammar and prompts can also be provided for Spanish in the "spa" sub-directory:

spa/InboxGrammar.gram
spa/InboxPromptl .wav

The grammar and prompts may be further specialized for Mexico in the "mx" sub-sub-directory:

spa/mx/InboxGrammar.gram
spa/mx/hiboxPromptl.wav

The query argument used to pass the locale to the VoiceLet is "lang". For example, to have the VoiceLet use the Mexican Spanish grammars and prompts, it would be invoked with:

"lang=spa-mx"

Two letter language codes would also be accepted for backwards compatibility, so the following would be equivalent:

"lang=es-mx"

Text To Speech Engine Configuration

VoiceLets can be configured to read text at a certain speed, and to use either a male or female voice. These parameters can be specified using the query arguments "speed" and "voice". For example:

"speed=2"

Tells the TTS engine to read the text at twice "normal" speed.

"voice=male" or "voice=female"

Tells the TTS engine to use a male/female voice when reading the text.

VoiceLet Interaction

VoiceLets can interact by passing information to each other. For example, the Address Book VoiceLet can be invoked by the Email VoiceLet to populate the recipients list when composing a message. This is accomplished using a VoiceXML sub-dialog mechanism, so that in the example above, the Address Book VoiceLet is incorporated as a sub-dialog in the Email VoiceLet, which is called at the appropriate time and returns its results as variables that can be accessed from the Email VoiceLet. NOTE:

Interacting with the Address Book VoiceLet may require going back to the server to fetch its VoiceXML dialog, because otherwise the Address Book VoiceLet would have to be invoked as soon as the Email VoiceLet is invoked, just in case it is needed (this would presumably cause an additional time delay). However, the Email VoiceLet's context is maintained so that the Address Book VoiceLet returns to the correct place. Thus, use of a VoiceXML browser is preferred for this purpose, where the Address Book VoiceLet sets some shared variables that the Email VoiceLet reads once the Address Book VoiceLet returns.

User Authentication VoiceLet

The User Authentication VoiceLet is used to authenticate the user before she can access the Voice Habitat. This VoiceLet can be configured by the administrator to use different authentication schemes, based on what is appropriate for the application. Illustrative authentication schemes include:

1. PIN only—Preferably used when a small number of users needs to securely access the Habitat. Each user is assigned a unique Personal Identification Number, which can be either spoken or entered via the telephone keypad, computer keyboard, touchscreen, or any other suitable input device when the user attempts to access the Voice Habitat.
2. Account number & PIN—Preferably used when a large number of users need to be uniquely identified. The account number can be any unique number chosen by the user (e.g. their phone number). The PIN does not have to be unique, and is kept secret by the user. When a user dials in, she provides both the account number and the PIN, either through speech, or using the keypad (or other input device).
3. Speaker Verification—Used to verify the speaker using a voice print. Each user chooses a unique account number, which is entered using speech or DTMF at the time of the call. The user is then asked to speak a pass phrase, which must match the stored version both in terms of the text of the phrase, and in terms of the voice print of the person who recorded the pass phrase the first time.

Audio Advertisement VoiceLet

The Audio Advertisement VoiceLet plays back a short audio clip, and may provide the user with a menu of options for responding to the clip. The VoiceLet can, for example, be configured to read the audio clip from a file, to play streaming audio, and/or to rotate through a set of files randomly, in a specified sequence, etc. As an option, the user may be prevented from interrupting the audio clip. The menu options available to the user are specified along with the audio file (using a VoiceXML fragment). Example menu options include:

1. "Would you like to be connected to a salesperson?"—If yes, the specified sales number is called.
2. "Would you like to hear more about this offer?"—If yes, the user is taken to another Audio Advertisement VoiceLet, which has a longer audio segment and may allow the user to interrupt the audio.

Email VoiceLet

The Email VoiceLet provides access to various email systems using the Voice Habitat. Such email systems can include: Yahoo mail, Web-based email (such as Hotmail using a recorded pattern), POP3 email, IMAP email, and Microsoft Exchange (MAPI). The VoiceLet reads its configuration information from the user profile and/or the user configures the VoiceLet by specifying their mail server, and username and password. This information includes:
1. Which email system to access (Hotmail, POP3, etc.)
2. Required authentication parameters (username+password) for the selected system.
3. Additional configuration settings, e.g. how many messages to make available on a single Page.

The VoiceLet presents a uniform interface across the different email systems, allowing the user to:
1. Hear a summary of their inbox.—A summary of the inbox is audibly output to the user, including sender and subject of each message. The user can at any time select a message to go to, using a numeric code assigned to each message.
2. Hear all new messages.—All new messages are audibly output to the user, along with such things as the sender and subject of each message, date and time sent, importance level, whether each message has an attachment, etc.
3. Select a particular message to listen to.—The user is allowed to choose to listen to the message using Text to Speech. Preferably, the user can stop the replay at any time, or begin re-playing the message again from the beginning using a hot words feature. Replay can be implemented using the Content VoiceLet (described below).
4. Reply to the message by recording an audio reply.—The user is allowed to reply to the message by recording an audio reply, which is sent to the recipient as an audio file attached to the email, and/or is converted to text using a speech-to-text engine. The user can choose to reply to some or all recipients, or only to the sender.
5. Forward the message to someone else.—The user can forward the message to a user or group (picked from their address book), and can optionally record an audio segment to attach to the forwarded message as well.
6. Delete the message from the inbox.—The user can delete the message.
7. Read attachments.—Attachments are read to the user.
8. Auto dial to the sender.—The user device automatically calls or connects to the sender of the email upon receiving a command to do so from the user.
9. Compose a new message.—The user is allowed to compose a message by naming the recipient and speaking the text of the message. A speech-to-text converter can be used to convert the dialog into the textual body of the message.

Other Note that the recipient may be selected using the Address Book VoiceLet as well.

Refresh lNew Messages

At any time the user can say "Refresh" or "New Messages" to cancel out of what they are currently doing to hear any new messages that may have arrived since he or she first called up. The New Messages dialog is described below.

New Messages Dialog

When the user first connects to the Email VoiceLet, a list of all the new messages in the user's inbox is audibly output to the user in sequence according to one embodiment. The user can at any time ask the VoiceLet to read all new messages that arrived since the start of the session by saying "Refresh" or "New messages". While each message is being replayed, the user is in the "Message Dialog" described below.

According to another embodiment, if the user has new messages, the system tells the user how many new messages he/she has, and then begins to read the messages to the user. Each message is marked as "read" by the system, so that it will not be considered new again the next time the user calls up. If the underlying protocol doesn't support marking the message as "read", the Voicelet can keep track of the read/unread state of the message.

Inbox Dialog

When the user listens to the summary of the inbox, the inbox may be presented as a series of pages. Each page may contain a specified number of messages, e.g. 20. The user can advance to the next or previous page at any time. Upon entering the page, the user hears a summary describing the page. This summary can include:
1. The total number of messages on the page.
2. The number of new (not previously listened to and/or viewed) messages on the page.
3. The delivery date of the newest and oldest message on the page.

While listening to a page, the following information is audibly output for each message:
1. A numeric identifier for the message, which the user can speak at any time to go to that message.
2. The sender of the message, the subject, and the date.

The user can select a particular message by uttering the number or other identifier of the message. This takes the user to the message dialog.

If the user selects to hear new messages, the messages are read out in order, each one preferably using the Message Dialog described below.

Message Dialog

The message dialog presents a single message to the user. At any time the user may exit this dialog by saying:
1. Next—Go to the next message.
2. Previous—Go to the previous message.
3. Inbox/Up/Main, etc.—Return to the inbox page containing the current message.
4. Cancel—Exit the current state, e.g. when in the Reply dialog, the user can cancel out of the reply. The user would be returned to the message to which he were composing a reply.

As an option, the user may ask to hear a detailed summary of the message, which includes the:
1. Sender of the message.
2. Subject of the message.

The user can hear more details about the message by saying "Details" or the like, upon which more details about the message can be output, including:
1. Delivery date of the message.
2. Size of the message text, not including attachments (e.g. "This message contains 350 words").
3. Name, type and size of any attachments.
4. Content of any attachments.

The user can skip the summary by saying "Skip" or "Continue" for example.

The entire message can be read to the user. At any time, the user may stop the reading of the message by saying (as described in the Content VoiceLet):
1. Stop—Message reading is stopped, and the system waits a predetermined amount of time for further instructions.
2. Fast forward/skip ahead—The system skips a few sentences or paragraphs ahead. Alternatively, the system may skip forward by an amount of time, e.g., 5 seconds.

3. Rewind—The system goes back a few sentences or paragraphs, or an amount of time.
4. Repeat—The message is re-read in its entirety (with or without the summary) from the beginning.
5. Reply—The user is taken to the Reply Dialog.
6. Forward—The user is taken to the Forward Dialog.
7. Delete—The user is taken to the Delete Dialog.
8. Next/Previous/Inbox, etc.—See above.

Reply Dialog

In the Reply Dialog, the user is prompted to record a short audio reply. By default the reply is sent back to the sender of the message. However, by saying "Options" the user is taken to a sub-dialog where she can specify options to specify parameters of the reply. Illustrative options are:
1. Reply to all—Reply is sent to all recipients.
2. Reply with history—Reply includes the original message.
3. Importance high/low—Sets message importance.
4. Add recipients—The user is taken to the Recipients sub-Dialog to add additional recipients to the message.
5. Reply by phone—A phone call that plays the recorded reply is placed to each of the recipients.
6. Send text—The audio reply is converted to text and sent to the recipients.

Upon completing the recording, the message is sent, and the user is optionally told that the message was sent. The user is returned to the message dialog for the message to which they just replied.

Add Recipients Dialog

This dialog allows the user to add recipients to the message by selecting recipients from the address book VoiceLet as described below.

Forward Dialog

The forward dialog allows the user to forward the message, optionally attaching a short audio recording to the forwarded message. This dialog is similar to the Reply Dialog, except that the Reply options are not available (reply all, reply with history), and that the user is taken immediately to the add recipients sub-dialog. After adding the recipients, the user is prompted to record the audio segment. Upon completion, the message is sent, and the same options are available as in the Reply dialog.

Delete Dialog

The Delete dialog confirms that the user wants to delete the message by asking the user: "Are you sure you want to delete message <number> from <sender>, <subject> received on <date>". If yes, the message is deleted. If no, the user is returned to the message dialog.

Address Book VoiceLet

The Address Book VoiceLet provides basic access to a user's address book, including the Windows directory, Microsoft Exchange address book, and any Lightweight Directory Access Protocol (LDAP) compliant address book. The Address Book VoiceLet can also provide access to a corporate directory.

Configuration

The Address Book VoiceLet can be configured through command-line (query string) arguments passed to it at runtime. The following query string arguments can be passed to the VoiceLet:
1. Address Book location
2. Address Book access protocol
3. Email mode—Returns the email address of the users that are looked up
4. Phone mode—Returns the phone numbers of the users that are looked up
5. Browse mode—Reads out the entries that are looked up Operation When invoked, the Address Book VoiceLet listens for instructions from the user. The main function of the VoiceLet is to allow the user to locate a specific user record. In use, the user can:
1. Pick a user to call or email to. Note that this can also be done using a different VoiceLet, e.g. Email VoiceLet, which calls this VoiceLet to get the information.

The information is returned to the calling VoiceLet and the user continues their interaction with that VoiceLet.
2. Hear the entry for a particular user.

The user can be allowed to search for the desired entry or entries in the following exemplary ways:
1. All users' first and last names are automatically added to the grammar, allowing the user to locate a record or set of records simply by stating the first and/or last name. This can also include group names.
2. If more than one entry is found, the user is asked which entry to use. The user may say "All" to use all entries. Otherwise the user can listen to the entries, and confirm or deny each one.
3. Alternatively the user can search by skipping to a known name that is close to the desired one. For example, the user might say "Go to 'Smith'", and the system would start reading out the names that lexicographically include and follow "Smith". The user can select a particular entry at any time by saying "Select".

In any of the above cases, the number of names in the list can be spoken before the list is read out, so that the user knows how many entries (at most) they may have to listen to before getting to the desired entry.

Content VoiceLet

The Content VoiceLet reads or plays a specific content item (text or audio), and provides options to the user while listening to the content. Options include:
1. Pause/Stop—Suspend speaking the content, and resume again from the same point. NOTE: Due to limitations of the VoiceXML platform, the application has to specify the breaking points in the text from where TTS would continue.
2. Resume/Continue—Continue (see Pause).
3. Up—Discontinue listening to the content. The user is taken to the container (Window or View).
4. Fast forward/skip ahead—As described earlier.
5. Rewind—As described earlier.
6. Next/Forward/Skip—The user is taken to the next content item.
7. Previous/Back/Last—The user is taken back to the previous content item.
8. Repeat—The user hears the content item again from the beginning.

Configuration

The VoiceLet is configured by the administrator to read a specific content item. Content items may include dynamic content like an article dragged in from the web, an email message, etc. The content may also be a static content item like an audio file and/or a text file.

The Content VoiceLet can be configured through command-line (query string) arguments passed to it at runtime. The following query string arguments can be passed to the VoiceLet:

1. Content Id (c)—Identifies the content item that the VoiceLet will play. The content item can be any content stored in the data store, including headline (in which case the summary or entire article is played), audio file, office file, table, news feed, etc.
2. Section (s)—Indicates the granularity at which the user can pause/resume the content. Exemplary values are:
   a. 1—User can pause/resume on each sentence in the text.
   b. 2—User can pause/resume on each paragraph in the text.
   c. A list of HTML/XML element names is provided. The user is allowed to pause/resume at boundaries marked by one of these elements in the text.
3. Forward—Indicates the number of multiples of section that are skipped when the user chooses to fast forward. For example, if the section is a sentence, and forward is set to 3, then the system will skip 3 sentences if the user chooses to fast forward. A value of 0 disables fast forward.
4. Rewind—Same as forward, but specifies multiples of section to skip, or go back over, when rewinding.
5. Interruptible (i)—If true (1) then the user can Pause the VoiceLet at any time while hearing the contents. If false (0) the user cannot Pause the VoiceLet. Instead, the VoiceLet pauses automatically after each section to wait for the user. This is useful for such things as driving directions, where the system can automatically wait for the user after giving each direction. In this case the user can either repeat the previous section, or resume, which would continue with the next section.
6. Timeout (t)—Number of minutes the system should wait for the user to resume. If the user does not provide a valid command within this amount of time, the system can exit automatically.
7. Dictionary—Points to a dictionary file that specifies how to pronounce certain words and abbreviations that are likely to occur in the content. Several standard dictionaries can be provided, e.g. World News, US News, etc. These dictionaries may be updated from time to time, and can also be extended, or copied and further customized by the user.

Operation

When invoked, the Content VoiceLet begins reading the content immediately. If the content is an audio file, replay cannot be paused/resumed. The content is played in its entirety, and when finished, control is returned to the system, or to the VoiceLet that launched the Content VoiceLet.

Pause/Stop

As mentioned above, the VoiceLet can also be configured to indicate where the pausable breaks should occur in the text (if the content is text as opposed to audio). For example, the VoiceLet may be configured to allow the user to pause every sentence, every paragraph. Preferably, when the user resumes after pausing the system, the output resumes from the beginning of the sentence/paragraph/ the user were hearing when he said "Pause". After the user instructs the system to pause, the system waits in a cascading fashion for further instructions. An example cascade might be:
1. After 1 minute the system asks the user for instructions.
2. After an additional 2 minutes the system asks the user for instructions.
3. After an additional 5 minutes the system asks the user again for instructions.
4. After an additional 2 minutes the system disconnects.

The above example gives the user a total of 10 minutes to continue after they pause. This total time may be adjusted using the timeout argument, and can be based on the application's needs and/or user preferences.

According to another illustrative embodiment, if the interruptible option has been set, then the user may pause the reading of the content at any time by saying "Pause" or "Stop". At that point the user is transferred to a waiting area (i.e., Stopped state). The dialog might go something like this:
1. System: President Bush arrived in Hong Kong today . . .
2. User: Stop
3. System: I await your instructions. I will wait for 10 minutes.
4. System (after 1 minute): I have waited 1 minute. I will wait for 9 minutes.
5. System (after 4 additional minutes): I have waited 5 minutes. I will wait for 5 more minutes.
6. System (after 10 minutes): I have waited 10 minutes. Goodbye.

While in the Stopped state, the system can periodically tell the user how much time has gone by, and how much time is left. The total amount of time is specified by the Timeout parameter. A timeout of value of "−1" tells the system to wait forever. At any time while the system is waiting, the user may return to playing the content by saying "Resume" or "Continue". The dialog might go something like this:
1. System: President Bush arrived in Hong Kong today . . .
2. User: Stop
3. System: I await your instructions. I will wait for 10 minutes.
4. System (after 1 minute): I have waited 1 minute. I will wait for 9 minutes.
5. User: Continue
6. System: President Bush arrived in Hong Kong today . . .

Notice that in this example, the system resumes from the beginning of the section being played. The section could be a paragraph boundary, or even a sentence boundary. This helps the user preserve the context. Note that the system can also resume from the point in the content where paused.

Fast Forward/Rewind

If enabled, this allows the user to forward or rewind the reading of the text at any time while the text is being read.

Noise

While in the stopped state, the user may be talking to someone else, or there may be background noise. During this time the system may pick up stray commands or noises, which it does not recognize. These are preferably ignored by the system, which can wait until it receives a valid command to resume. Further, the noise may not affect the total amount of time that the system waits for a valid command from the user.

Interruptible Pause/Resume

Sentences can be identified using several heuristics. The following heuristics may be utilized:
1. A period followed by white space separates one sentence from the next.
2. If a potential sentence is less than x characters (e.g. x=50) then it is not deemed a sentence and the search for the end of the sentence continues to the next period.

This is to avoid breaking at abbreviations, e.g. "St. Louis", where "St" would otherwise count as a sentence.

3. If a potential sentence is more than x characters (e.g. x=100) then it is deemed too long a sentence, and will be split into smaller chunks at word boundaries.

Non-interruptible

If the VoiceLet is not interruptible, then the user cannot explicitly pause or stop the system. Instead, the VoiceLet may pause after each section is read, and wait for the user's instructions, as described above. Preferably, when the user indicates to continue, the VoiceLet begins reading the next section. To re-read the previous section, the user can say "Repeat" as described below. The user can also say "Forward" and "Rewind" to skip multiple sections in either direction.

Other Commands

Other commands available during playback can include:
1. Repeat—If the VoiceLet is interruptible, the Repeat command repeats the current section being read (equivalent of doing a Pause, followed immediately by a Resume). If the VoiceLet is not interruptible, then this command applies only while stopped, and causes the VoiceLet to repeat the previous section (the section may be read prior to being stopped).
2. Exit/Goodbye, etc.—Causes the VoiceLet to exit.
3. Start over—Causes the VoiceLet to start over from the beginning, providing the same result as exiting the VoiceLet, then re-entering immediately.
4. Go to section <n>—Allows the user to go directly to a particular section by naming the section and/or identifier of the section, such as its number. The name and/or identifier may be included as part of the section when it is read.
5. Menu/Help—Tells the user what choices are available to him/her.

Dictionary

The Dictionary file specified in the configuration is used to replace certain words or abbreviations that may occur in the text, with phonetic spellings. These may be differently expressed, depending on the VoiceXML browser being used. The VoiceLet preferably includes several common dictionaries, formatted for specific VoiceXML browsers if necessary. The system can determine at runtime which version of a particular Dictionary file to use based on the VoiceXML browser. For example, the news Dictionary may consist of two files, news_nuance.dict and news-speechworks.dict. The following list includes several dictionaries that can be provided by the system. Note that these may be combined, copied and/or modified by the person configuring the VoiceLet:

1. World News—Includes pronunciations of prominent world leaders, countries, cities, etc.
2. US News—Includes pronunciations of prominent political leaders, organizations, cities, etc.
3. Sports—Sports terms, team and player names, etc.
4. Finance—Common abbreviations used in the financial industries, including stock quotes.
5. Entertainment—Names of popular stars, events, movie titles, etc.

Custom pronunciations can also be specified. Further, a user or administrator can record specific words and have the recorded version inserted in any text before it is read to the user. The user can edit any of the above lists or files, which allows customization when dealing with, for example, email, pronouncing common nouns, names, etc. Different dictionaries can be provided for different human languages.

Security VoiceLet

The Security VoiceLet is similar to the User Authentication VoiceLet, but it is used to provide additional security over and above user authentication to the Habitat. The Security VoiceLet can be used to protect access to sensitive content. For example, the Security VoiceLet can be attached to any other VoiceLet to protect access to the other VoiceLet, or it can be attached to an entire container such as a View or Window to protect access to that container.

When the Security VoiceLet is instantiated, the user specifies the authentication scheme that should be used to authenticate the user to the Security VoiceLet, and, optionally, another VoiceLet to invoke upon authentication. At runtime the user is first authenticated using the specified authentication scheme, and then the user is transferred to the protected VoiceLet. The implementation is such that the user can visually associate a Security VoiceLet with another VoiceLet. The other VoiceLet can then no longer be accessed without first authenticating to the Security VoiceLet.

Exit VoiceLet

The Exit VoiceLet provides for a graceful exit from the application. When invoked it prompts the user to confirm that he or she really wishes to exit. Also the VoiceLet can be configured with additional options, including:

1. Transferring the user to an operator.
2. If the user confirms that he wants to exit, the VoiceLet plays a recorded greeting or text file (using text to speech synthesis). If no file is provided, the VoiceLet can say "Goodbye".

VoiceLet Configuration

VoiceLets can be configured by an administrator, by an end user, etc. As an option, the scope of VoiceLet functionality can be limited. Some VoiceLets, like Authentication and Exit, can have Habitat scope, meaning that they apply to the entire Habitat application, and all its users. Other VoiceLets preferably have user scope, meaning that they apply only to those users who have activated an instance of the VoiceLet in their Habitat. Configuration of VoiceLets that have Habitat scope can optionally be limited to an administrator only.

VoiceLets can be added to a Content Repository by an administrator, thus making them available to the Habitat's users. As a further option, the VoiceLet can be placed in a shared view or window, whether or not it requires any user configuration, e.g. a Content VoiceLet. From the Content Repository, the user drags and drops the VoiceLet into a voice-enabled window. At that point the user is prompted to do any final configuration required, e.g. enter the username and password and mail server for the Email VoiceLet. Once in the Habitat, the VoiceLet is visible in the "Edit" mode, so it can be reconfigured if necessary, but is not displayed when viewing the Habitat through a browser.

The table below summarizes the different VoiceLets described above, and how they can be configured according to an embodiment of the present invention. Note that the configurations can vary. Also note that this list should in no way be considered exhaustive.

TABLE 1

| VoiceLet | Scope | Administrator | User | Comments |
|---|---|---|---|---|
| Authentication | Habitat | Admin selects the type of authentication that is required. | User selects account number and/or PiN during registration. | |
| Audio Advertisement | Habitat | Admin selects the content, and how and how often content should be refreshed. | N/A | User does not see VoiceLet, even in "Edit" mode. |
| Basic Email | User | Admin adds VoiceLet to Content Repository. Can be pre-configured with the email server name, and protocol type (IMAP, POP3, Web). | User adds to Habitat, and configures username and password. | User can change any of the parameters when in "Edit" mode. |
| Basic Address | User | Admin adds VoiceLet to Content Repository. Can be pre-configured with the directory server name and protocol type (LDAP) | User adds to Habitat. | This VoiceLet can be accessed from the Email VoiceLet, even if the user did not add it their Habitat. |
| Personal Address | User | Admin adds VoiceLet to Content Repository. Can be pre-configured with the personal directory server name and protocol type (LDAP) | User adds to Habitat, and configures username and password. Can share config info with Email servlet. | This VoiceLet can be accessed from the Email VoiceLet only if the user added it to their Habitat! |
| Content | Habitat | Admin adds VoiceLet to Content Repository. Similar to advertisement config. | User adds to habitat. | Content can be dynamically refreshed, or be static. |
| Security | User | N/A | User associates VoiceLet with a particular site (URL) that has been added to the habitat already. | User specifies security mechanism and authentication info. |
| Exit | Habitat | Admin configures the VoiceLet with what greeting to use and what options to provide to the User (need details!). | N/A | |

Implementation Details

VoiceLets can be implemented as a special type of Content. When a VoiceLet is instantiated, it may be given a Content Id, which is used to access the VoiceLet. The VoiceLet can render itself using the VoiceLet API (described below) and a Voice Transcoder API, in addition to a standard Transcoder API. The fixed configuration parameters can be stored in a database as properties of the VoiceLet. User profile parameters can read from a user profile when the VoiceLet is rendered or thereafter, and query arguments are retrieved by the VoiceLet from the request. More details regarding the Transcoder can be found in U.S. Patent Application entitled SYSTEM, METHOD AND COMPUTER PROGRAM PRODUCT FOR PAGE RENDERING UTILIZING TRANSCODING, filed Aug. 28, 2001 under Ser. No. 09/942,051 and assigned to common assignee, Clickmarks, Inc., and which is herein incorporated by reference for all purposes.

VoiceLet API

VoiceLets are built using the VoiceLet API. This API includes high-level functions that implement re-usable chunks of VoiceLet functionality. Each VoiceLet is built by assembling a collection of these functions. API functions include:

1. InterruptiblePauseResume—Given a piece of marked-up text, generates the VoiceXML required to allow the user to Pause/Resume the playing back of that text in an interruptible fashion.
2. NonInterruptiblePauseResume—Given a piece of text, generates the VoiceXML required to pause after each section.
3. Fast forward/Rewind—Options to 1 and 2 above; if specified the user can fast forward or rewind the text by a specified number of sentences or seconds.
4. ApplyDictionary—Given a piece of marked-up text, applies the specified dictionary to the text, replacing matching words/abbreviations with phonetic pronunciations.

5. LookupList—Given a list of choices generates the VoiceXML that allows the user to select all matching entries from the list, and to further select one or more entries from the result set.
6. LookupListAlphabetic—Given a list, generates the VoiceXML that allows the user to narrow down the set one letter at a time.
7. ExitDialog—Generates an exit dialog.

The VoiceLet uses these functions to generate its output. It may add additional hotwords (global commands) to the output as well. This allows the Email VoiceLet to re-use the Pause/Resume feature, while adding Email specific features like Reply, Forward, etc.

While various embodiments have been described above, it should be understood that they have been presented by way of example only, and not limitation. Therefore, the breadth and scope of a preferred embodiment should not be limited by any of the above-described exemplary embodiments, but should be defined only in accordance with the following claims and their equivalents.

What is claimed is:

1. A method for providing a voicebased interface, comprising:
    installing multiple voice applications at a server;
    receiving a request to instantiate one of the voice applications;
    setting permissions for specifying whether a user can instantiate the voice application;
    receiving user-specific configuration parameters, wherein at least a portion of the user-specific configuration parameters, are read from a profile of the user, wherein at least a portion of the configuration parameters are input by the user, wherein at least a portion of the configuration parameters are fixed;
    instantiating an instance of the voice application in a modified form based on the user-specific configuration parameters;
    selecting content for output;
    verbally outputting the content using the voice application, wherein the instance of the voice application pauses the output and resumes the output, wherein the instance of the application fast-forwards and rewinds the output, wherein a time before a timeout occurs is output to the user when the output is paused;
    allowing sharing of the instance of the voice application among multiple users;
    receiving configuration parameters specific to a second user, and instantiating a second instance of the voice application in a modified form based on the configuration parameters specific to the second user;
    receiving additional configuration parameters from the user after instantiating the instance of the voice application; and
    further modifying the instance of the voice application based on the additional configuration parameters;
    wherein multiple instances of the voice application communicate with each other;
    wherein one of the voice applications is used to interact with an address book;
    wherein one of the voice applications is used to audibly output content to the user, wherein the voice application pauses the output and resumes output;
    wherein one of the voice applications is used to interact with an electronic mail system, wherein the interaction includes at least one of retrieving a summary of an inbox, selecting a message, audibly outputting a message, creating a message, replying to a message, forwarding a message, and deleting a message;
    wherein one of the voice applications provides a security function;
    wherein the instance of the voice application communicates with a different type of voice application.

2. The method as recited. in claim 1, wherein a portion of the configuration parameters are passed as runtime arguments.

3. The method as recited in claim 1, wherein one of the voice applications provides an alert.

4. The method as recited in claim 1, wherein at least a portion of the content is output using speech synthesis.

5. The method as recited. in claim 1, wherein one of the voice applications authenticates an identity of a user.

6. The method as recited in claim 1, wherein the user is allowed to issue voice commands to one of the voice applications.

7. The method as recited in claim 1, wherein the output is paused upon receiving a spoken command from the user.

8. A computer-based system embedded in a computer-readable storage medium, executed by one or more processors, for initiating a voice-based interface, comprising:
    logic for installing multiple voice applications at a server;
    logic for receiving a request to instantiate one of the voice applications;
    logic for setting permissions for specifying whether a user can instantiate the voice application;
    logic for receiving user-specific configuration parameters, wherein at least a portion of the user-specific configuration parameters are read from a profile of the user, wherein at least a portion of the configuration parameters are input by the user, wherein at least a portion of the configuration parameters are fixed;
    logic for instantiating an instance of the voice application in a modified form based on the user-specific configuration parameters;
    logic for selecting content for output;
    logic for verbally outputting the content using the voice application, wherein the instance of the voice application pauses the output and resumes the output, wherein the instance of the application fast-forwards and rewinds the output, wherein a time before a timeout occurs is output to the user when the output is paused;
    logic for allowing sharing of the instance of the voice application among multiple users;
    logic for receiving configuration parameters specific to a second user, instantiating a second instance of the voice application in a modified form based on the configuration parameters specific to the second user;
    logic for receiving additional configuration parameters from the user after instantiating the instance of the voice application; and
    logic for further modifying the instance of the voice application based on the additional configuration parameters;
    wherein multiple instances of the voice application communicate with each other;
    wherein one of the voice applications is used to interact with an address book;
    wherein one of the voice applications is used to audibly output content to the user;
    wherein the voice application pauses the output and resumes output;
    wherein one of the voice applications is used to interact with an electronic mail system, wherein the interaction includes at least one of retrieving a summary of an inbox, selecting a message, audibly outputting a message, creating a message, replying to a message, forwarding a message, and deleting a message;

wherein one of the voice applications provides a security function;

wherein the instance of the voice application communicates with a different type of voice application.

9. The system as recited in claim 8, wherein a portion of the configuration parameters are passed as runtime arguments.

10. The system as recited in claim 8, wherein one of the voice applications provides an alert.

11. The system as recited in claim 8, wherein at least a portion of the content is output using speech synthesis.

12. The system as recited in claim 8, wherein one of the voice applications authenticates an identity of a user.

13. The system as recited in claim 8, wherein the user is allowed to issue voice commands to one of the voice applications.

14. The system as recited in claim 8, wherein the output is paused upon receiving a spoken command from the user.

15. A computer program product embodied on a tangible computer readable medium for initiating a voice-based interface, comprising:

computer code for installing multiple voice applications at a server;

computer code for receiving a request to instantiate one of the voice applications;

computer code for setting permissions for specifying whether a user can instantiate the voice application;

computer code for receiving user-specific configuration parameters, wherein at least a portion of the user-specific configuration parameters are read from a profile of the user, wherein at least a portion of the configuration parameters are input by the user, wherein at least a portion of the configuration parameters are fixed;

computer code for instantiating an instance of the voice application in a modified form based on the user-specific configuration parameters;

computer code for selecting content for output;

computer code for verbally outputting the content using the voice application;

wherein the instance of the voice application pauses the output and resumes the output, wherein the instance of the application fast-forwards and rewinds the output, wherein a time before a timeout occurs is output to the user when the output is paused;

computer code for allowing sharing of the instance of the voice application among multiple users;

computer code for receiving configuration parameters specific to a second user, and instantiating a second instance of the voice application in a modified form based on the configuration parameters specific to the second user;

computer code for receiving additional configuration parameters from the user after instantiating the instance of the voice application; and computer code for further modifying the instance of the voice application based on the additional configuration parameters;

wherein multiple instances of the voice application communicate with each other;

wherein one of the voice applications is used to interact with an address book;

wherein one of the voice applications is used to audibly output content to the user, wherein the voice application pauses the output and resumes output;

wherein one of the voice applications is used to interact with an electronic mail system, wherein the interaction includes at least one of retrieving a summary of an inbox, selecting a message audibly outputting a message, creating a message, replying to a message, forwarding a message, and deleting a message;

wherein one of the voice applications provides a security function;

wherein the instance of the voice application communicates with a different type of voice application.

16. The computer program product as recited in claim 15, wherein a portion of the configuration parameters are passed as runtime arguments.

17. The computer program product as recited in claim 15, wherein one of the voice applications provides an alert.

18. The computer program product as recited in claim 15, wherein at least a portion of the content is output using speech synthesis.

19. The computer program product as recited in claim 15, wherein one of the voice applications authenticates an identity of a user.

20. The computer program product as recited in claim 15, wherein the user is allowed to issue voice commands to one of the voice applications.

21. The computer program product as recited in claim 15, wherein the output is paused upon receiving a spoken command from the user.

* * * * *